United States Patent
Takaoka et al.

(12)
(10) Patent No.: US 6,306,973 B1
(45) Date of Patent: Oct. 23, 2001

(54) POLYPROPYLENE BLOCK-COPOLYMER RESIN AND PROCESS FOR PRODUCING IT

(75) Inventors: Tohru Takaoka, Ichihara; Mikio Hashimoto, Sakai; Nobuyosi Momoda, Wakayama, all of (JP)

(73) Assignee: Grand Polymer Co. Ltd., Tokyo (JP)

( * ) Notice: Subject to any disclaimer, the term of this patent is extended or adjusted under 35 U.S.C. 154(b) by 0 days.

(21) Appl. No.: 09/497,227

(22) Filed: Feb. 3, 2000

(30) Foreign Application Priority Data

Feb. 4, 1999 (JP) .................................................. 11-027133

(51) Int. Cl.$^7$ ............................ C08L 23/12; C08F 110/06
(52) U.S. Cl. .......................... 525/240; 525/243; 525/245; 525/247; 525/323; 526/351
(58) Field of Search .................................. 525/240, 243, 525/245, 247, 323; 526/351

(56) References Cited

U.S. PATENT DOCUMENTS

| | | |
|---|---|---|
| 4,550,145 | 10/1985 | Kasahara et al. . |
| 5,579,913 | 12/1996 | Yamada et al. . |
| 5,837,764 * | 11/1998 | Akagawa et al. .................... 524/451 |

FOREIGN PATENT DOCUMENTS

| | | |
|---|---|---|
| 0280297 | 8/1988 | (EP) . |
| 0509662 | 10/1992 | (EP) . |
| 0736552 | 10/1996 | (EP) . |
| 0776939 | 6/1997 | (EP) . |
| 0789054 | 8/1997 | (EP) . |
| 0916701 | 5/1999 | (EP) . |
| 931299 | 2/1997 | (JP) . |

* cited by examiner

*Primary Examiner*—James J. Seidleck
*Assistant Examiner*—Olga Asinovsky

(57) ABSTRACT

Polypropylene block-copolymer resin exhibiting high melt tension and improved moldability with balanced stiffness and impact resistance may be molded at high speed into large-sized articles, including, stretched films, with good appearance and resistance to deformation. The block copolymer includes a higher molecular weight polypropylene segment, a lower molecular weight polypropylene segment and an ethylene α-olefin copolymer segment. When subjected to dissolution fractionation m paraxylene, a large proportion is insoluble at 23° C. but soluble at 135° C., and a smaller portion is soluble at 23° C. The block copolymer has a melt flow rate of 0.01 to 5 g/10 min at 230 C. (2.16 kg) and a molecular weight distribution Mw/Mn of 6–20 and Mz/Mw of at least 3.5. A continuous multistage polymerization may be used to form the block copolymer.

26 Claims, No Drawings

POLYPROPYLENE BLOCK-COPOLYMER RESIN AND PROCESS FOR PRODUCING IT

FIELD OF THE INVENTION

The present invention relates to a polypropylene block-copolymer resin and to a process for producing such block-copolymer resin.

BACKGROUND OF THE TECHNIQUE

Polypropylene has widely been used in various fields including automobile parts, machine and electric appliances, household commodities, kitchen utensils and packaging films. However, problems have been brought about in that large-sized formed articles are difficult to obtain by, for example, extrusion molding, and in that a high speed molding can scarcely be attained, since polypropylene exhibits lower melt tension (abbreviated hereinafter sometimes as MT). Concretely, the following problems have been encountered:

(1) In blow molding, a phenomenon of "draw-down" due to stretching of the parison by its own weight, causing decrease in the film thickness may be apt to occur, whereby blow molding of large-sized articles, for example, automobile parts, such as bumper and spoiler; and others, such as bottles, is rendered difficult.

(2) In the case of production of sheet or film by a calendering technique, the resulting sheet or film may often suffer from thickness irregularity and, in addition, it has a lower surface gloss.

(3) In the case of production of formed articles by extrusion molding, a high-speed molding may scarcely be practiced and, in addition, large-sized extrusion-molded articles may difficultly be obtained.

(4) In the case of production of vacuum- or pressure-formings from a sheet by a vacuum- or pressure-forming technique, large-sized molded articles are difficult to obtain and, in addition, a deep drawing may difficultly be incorporated.

(5) In the case of production of sheet or film by an inflation molding technique, a poor surface condition may often be encountered, since the balloon may often become unstable.

(6) In the case of producing stretched films, the resulting film may be apt to suffer from occurrence of so-called surging, so that an accident of film breaking upon the stretching may occur and, in addition, the resulting stretched film exhibits a low thickness accuracy.

(7) In the case of producing foamed articles, foaming with a high foaming ratio may difficultly be attained and, in addition, the cells of foamed article are large and coarse with non-uniform cell size.

In order to avoid these problems, it has heretofore been practiced to employ such polypropylene reins as given below in which the melt tension is increased:

1) A polypropylene resin composition prepared by blending a polypropylene with a high-pressure low-density polyethylene or with a high-density polyethylene 2) A polypropylene resin having a widely extended molecular weight distribution 3) A modified polypropylene resin which is obtained by slightly cross-linking a polypropylene resin using a peroxide, electron irradiation or maleic acid 4) A branched long chain polypropylene resin which is obtained by introducing long chain branching upon the polymerization of propylene However, these prior art polypropylene resins having improved melt tension exhibit disadvantages in that the formed article produced therefrom reveals inferior appearance and/or lower transparency and in that the stiffness of the resin is insufficient, though occurence of draw-down is made scarce for all these resins. Alternatively, if the molding temperature is elevated in order to effect a high speed molding, problems may be brought about that the resin will suffer from deterioration due to increased heat evolution in the resin, causing higher trend to gel formation (fish eye formation). Moreover, additional process steps of blending of other resin components and an inevitably performed slight cross linking of the polymer by, for example, a peroxide or electron beam irradiation or by using maleic acid or the like makes the process costly.

In Japanese Patent Kokai Hei-9-31299 A, there is disclosed a resin composition of propylene polymers composed of an ethylene/propylene block copolymer component and a higher molecular weight polypropylene component, which is superior in mechanical properties, such as stiffness and surface hardness, and is also superior in the impact resistance. This composition consists of a mixture of an ethylene/propylene block copolymer component having an ethylene content of 0.3–10% by weight and a higher molecular weight polypropylene component having an isotactic pentad fraction of 0.90 or higher, wherein the proportion of a polymer fraction of molecular weights over 5,000,000 relative to the total composition is in the range from 1 to 10% by weight and the proportion of a polymer fraction of molecular weights below 10,000 is 10% by weight or lower and wherein the melt flow rate of the composition is in the range from 0.3 to 50 g/10 min.

Due to the content of the polymer fraction of molecular weights over 5,000,000 in an amount of 1–10% by weight, the resin composition of propylene polymers can provide improvements in the stiffness and in the surface hardness, nevertheless it suffers from problems in that it exhibits inferior flowability upon the melt-molding due to a high content of the higher molecular weight component or due to a content of an ultrahigh molecular weight fraction and in that the appearance of the molded article is inferior due to the quite poor uniformity of dispersion of the higher molecular weight component over the resin composition.

The resin composition of propylene polymers is prepared by melt kneading the ethylene/propylene block-copolymer component and the higher molecular weight polypropylene component, each produced separately of each other, whereby a further problem is brought about in that the production procedures are bothersome and a uniform melt-kneading of these components is difficult.

In WO 98/47959, there is disclosed a resin composition with crystalline polypropylene containing 3–65% by weight of a component soluble in paraxylene of 23° C., 35–97% by weight of a component soluble in paraxylene of 135° C. but insoluble in paraxylene of 23° C. and 0–30% by weight of a component insoluble in paraxylene of 135° C., wherein the said component soluble in 23° C. paraxylene is constituted substantially of an elastomer having an intrinsic viscosity [η] of 0.1–5 dl/g, the said component soluble in 135° C. paraxylene but insoluble in 23° C. paraxylene is constituted substantially of a crystalline polypropylene resin having an isotactic pentad fraction (mmmm fraction) of at least 97%, an Mw/Mn value of 6 or higher and an Mz/Mw value of 6 or higher and the said component insoluble in 135° C. paraxylene is constituted substantially of a filler. In Examples thereof, an elastomer based on styrene and an ethylene/α-olefin random copolymer are employed for the elastomer and a polypropylene resin having compounded therein a predetermined amount of a polypropylene block-copolymer resin or a higher molecular weight polypropylene resin is employed for the crystalline polypropylene resin.

The above-mentioned resin composition with crystalline polypropylene can be molded into a formed product exhibiting better appearance without occurrence of rashes and is superior in the flexural modulus and in the flowability upon the molding. However, this resin composition is obtainable with a costly and bothersome process, since the polypropylene block-copolymer resin and the higher molecular weight polypropylene resin are produced by polymerization courses independent of each other. In addition, if the amount of the higher molecular weight polypropylene resin to be compounded is increased on melt-kneading them, an increase in the shearing stress will result, whereby a problem is brought about in that it tends to suffering from deterioration of the resin and from insufficient dispersion of the higher molecular weight polypropylene resin in the composition.

DISCLOSURE OF THE INVENTION

An object of the present invention is to provide a polypropylene block-copolymer resin which exhibits a higher melt tension with better moldability and is superior in the balance between the stiffness and the impact resistance and which is obtainable in an easier manner and can be molded by a high speed molding into a large-sized molded article exhibiting a better appearance with difficultly deformable nature.

Another object of the present invention is to provide a process for producing the above-mentioned polypropylene block-copolymer resin in a simple and efficient manner with lower production cost.

Thus, the present invention provides for a polypropylene block-copolymer resin and for a process for producing said block-copolymer resin, as given below:

(1) A polypropylene block-copolymer resin comprising
- (A) 10–50% by weight of a higher molecular weight polypropylene part having an intrinsic viscosity [η], determined in decalin at 135° C., of 6–13 dl/g,
- (B) 10–89% by weight of a lower molecular weight polypropylene part having an intrinsic viscosity [72 ], determined in decalin at 135° C., of lower than 6 dl/g and
- (C) 1–40% by weight of an ethylene/α-olefin copolymer part having an intrinsic viscosity [72 ], determined in decalin at 135° C., of 0.1–13 dl/g, wherein the block-copolymer resin has, when being subjected to a dissolution fractionation with paraxylene, contents of constituent components of
- (X) 2–39% by weight of a component soluble in paraxylene of 23° C. and
- (Y) 61–98% by weight of a component soluble in paraxylene of 135° C. but insoluble in paraxylene of 23° C. and exhibits the following characteristic features <<1>> and <<2>>, namely,
    - <<1>> a melt flow rate (MFR), determined at 230° C. under a load of 2.16 kg, of 0.01–5 g/10 min. and
    - <<2>> a molecular weight distribution expressed by Mw/Mn, determined by gel permeation chromatography (GPC), of 6–20 and an Mz/Mw value of at least 3.5.

(2) A polypropylene block-copolymer resin as defined in the above (1), wherein the ethylene/α-olefin copolymer part (C) is an ethylene/α-olefin random copolymer having an ethylene content of 20–40% by weight and a content of an α-olefin of 3–12 carbon atoms of 60–80% by weight.

(3) A polypropylene block-copolymer resin as defined in the above (2), wherein the ethylene/α-olefin copolymer part (C) is an ethylene/propylene random copolymer.

(4) A polypropylene block-copolymer resin as defined in any one of the above (1) to (3), wherein it has the following characteristic feature <<3>>, namely,
- <<3>> an isotactic pentad fraction (mmmm-fraction) of the component (Y) soluble in paraxylene of 135° C. but insoluble in paraxylene of 23° C., determined by $^{13}$C-NMR, of at least 96%.

(5) A polypropylene block-copolymer resin as defined in any one of the above (1) to (4), wherein it has the following characteristic feature <<4>>, namely,
- <<4>> a molecular weight distribution of the component (Y) soluble in paraxylene of 135° C. but insoluble in paraxylene of 23° C., held under such a condition that, when the molecular weight distribution curve of the component (Y) on the molecular weight distribution diagram obtained by gel permeation chromatography (GPC) is divided at the maximum peak molecular weight into the higher molecular weight side half and the lower molecular weight side half, the ratio of the surface area $S_H$ for the higher molecular weight side half underlying under the said distribution curve relative to the surface area $S_L$ for the lower molecular weight side half underlying under the said distribution curve, namely, $S_H/S_L$, is at least 1.1 and the proportion of the surface area for a higher molecular weight portion of molecular weights of at least $1.5 \times 10^6$ relative to the integral surface area underlying under the entire molecular weight distribution curve is at least 8%.

(6) A polypropylene block-copolymer resin as defined in any one of the above (1) to (5), wherein it has the following characteristic feature <<5>>, namely,
- <<5>> a proportion of the 124° C.-eluted segment of the component (Y) soluble in paraxylene of 135° C. but insoluble in paraxylene of 23° C., determined by cross-fractionating chromatography (CFC), of at least 6% by weight and a weight-average molecular weight (Mw) of the said 124° C.-eluted segment of at least $1.0 \times 10^6$.

(7) A polypropylene block-copolymer resin as defined in any one of the above (1) to (6), wherein it has the following characteristic feature <<6>>, namely,
- <<6>> a melt tension (MT), determined by flow tester at 230° C., of 5–30 g.

(8) A process for producing a polypropylene block-copolymer resin as defined in any one of the above (1) to (7), comprising
polymerizing the monomers in a multistage polymerization of at least three stages in the presence of a polymerization catalyst formed from
- (a) a solid catalyst component based on titanium containing magnesium, titanium, a halogen and an electron donor,
- (b) a catalyst component based on organometallic compound and
- (c) a catalyst component based on organosilicic compound having at least one group selected from the group consisting of cyclopentyl, cyclopentenyl, cyclopentadienyl and derivatives of them, the said process comprising a stage of making up a higher molecular weight polypropylene part (A) having an intrinsic viscosity [η] of 6–13 dl/g up to a proportion of 10–50% by weight with respect to the total amount of the finally obtained polypropylene block-copolymer resin, by polymerizing propylene under substantial absence of hydrogen, a stage of making up a lower molecular weight polypropylene part (B) having an intrinsic viscosity [η] lower than 6 dl/g up to a proportion of 10–89% by weight with respect to the total amount of the finally obtained polypropylene block-copolymer resin, by polymerizing propylene, and a stage of making up an ethylene/α-olefin copolymer part (C) having an intrinsic viscosity [η] of 0.1–13 dl/g up to a proportion of 1–40% by weight with respect to the total amount of the finally obtained polypropylene block-copolymer resin, by copolymerizing ethylene with an α-olefin.

(9) A process for producing a polypropylene block-copolymer resin as defined in any one of the above (1) to (7), comprising polymerizing the monomers by a multistage polymerization of at least three stages in the presence of a polymerization catalyst formed from (a) a solid catalyst component based on titanium, containing magnesium, titanium, a halogen and an electron donor, (b) a catalyst component based on organometallic compound and (c) a catalyst component based on organosilicic compound having at least one group selected from the group consisting of cyclopentyl, cyclopentenyl, cyclopentadienyl and derivatives of them, the said process comprising, making up, in one or more polymerization steps in the first stage, a higher molecular weight polypropylene part (A) having an intrinsic viscosity [η] of 6–13 dl/g up to a proportion of 10–50% by weight with respect to the total amount of the finally obtained polypropylene block-copolymer resin, by polymerizing propylene under substantial absence of hydrogen, making up, then, in one or more polymerization steps in the second stage, a lower molecular weight polypropylene part (B) having an intrinsic viscosity [η] lower than 6 dl/g up to a proportion of 10–89% by weight with respect to the total amount of the finally obtained polypropylene block-copolymer resin, by polymerizing propylene and making up, then, in one or more polymerization steps in the third stage, an ethylene/α-olefin copolymer part (C) having an intrinsic viscosity [η] of 0.1–13 dl/g up to a proportion of 1–40% by weight with respect to the total amount of the finally obtained polypropylene block-copolymer resin, by copolymerizing ethylene with an α-olefin.

(10) A process as defined in the above (8) or (9), wherein the polymerizations in all the stages are effected in a continuous way.

(11) A process as defined in the above (9) or (10), wherein the polymerization for the higher molecular weight polypropylene part (A) in the first stage and/or for the lower molecular weight polypropylene part (B) in the second stage and/or for the ethylene/α-olefin copolymer part (C) in the third stage is effected using one or more polymerization reactors.

The polypropylene block-copolymer resin according to the present invention comprises, as polymers constituting the block-copolymer resin, the higher molecular weight polypropylene part (A) constituted of a higher molecular weight polypropylene, the lower molecular weight polypropylene part (B) constituted of a lower molecular weight polypropylene and the ethylene/α-olefin copolymer part (C) constituted of an ethylene/α-olefin copolymer. These polymer parts (A) to (C) constitute each the polymer formed in each of the first to third polymerization stages, respectively, in the polypropylene block-copolymer resin upon the production thereof.

The higher molecular weight polypropylene part (A) is constituted of a higher molecular weight polypropylene having an intrinsic viscosity [η], determined in decalin (decahydronaphthalene) at 135° C., in the range from 6 to 13 dl/g, preferably from 8 to 13 dl/g, more preferably from 8.5 to 12 dl/g, wherein the content of the higher molecular weight polypropylene part (A) in the polypropylene block-copolymer resin is in the range from 10 to 50% by weight, preferably from 10 to 45% by weight, more preferably from 10 to 43% by weight.

The lower molecular weight polypropylene part (B) is constituted of a lower molecular weight polypropylene having an intrinsic viscosity [η], determined in decalin at 135° C., of lower than 6 dl/g, preferably in the range lower than 6 and at least 0.1 dl/g, more preferably in the range from 5 to 0.1 dl/g, wherein the content of the lower molecular weight polypropylene part (B) in the polypropylene block-copolymer resin is in the range from 10 to 89% by weight, preferably from 35 to 80% by weight, more preferably from 45 to 80% by weight.

The difference between the intrinsic viscosity [η] of the higher molecular weight polypropylene part (A) in the polypropylene block-copolymer resin according to the present invention and that of the lower molecular weight polypropylene part (B) thereof may favorably be in the range from 1 to 12 dl/g, preferably from 2 to 12 dl/g, more preferably from 4 to 11 dl/g.

The ethylene/α-olefin copolymer part (C) is constituted of a random copolymer of ethylene with an α-olefin having an intrinsic viscosity [η], determined in decalin at 135° C., in the range from 0.1 to 13 dl/g, preferably from 1 to 11 dl/g, more preferably from 1 to 9 dl/g, wherein the content of the ethylene/α-olefin copolymer part (C) in the polypropylene block-copolymer resin may be in the range from 1 to 40% by weight, preferably from 5 to 40% by weight, more preferably from 5 to 35% by weight.

The polypropylene block-copolymer resin according to the present invention can be fractionally separated upon dissolution fractionation in paraxylene into a component (X) soluble in paraxylene of 23° C. and a component (Y) soluble in paraxylene of 135° C. but insoluble in paraxylene of 23° C., wherein the content of each of them in the block-copolymer resin is in the range from 2 to 39% by weight, preferably from 4 to 35% by weight, more preferably from 4 to 30% by weight, for the component (X) soluble in paraxylene of 23° C., and in the range from 61 to 98% by weight, preferably from 65 to 96% by weight, more preferably from 70 to 96% by weight, for the component (Y) soluble in paraxylene of 135° C. but insoluble in paraxylene of 23° C. These components (X) and (Y) are those separated upon the dissolution fractionation of constituent components of the polypropylene block-copolymer resin in paraxylene.

The dissolution fractionation with paraxylene is performed in the manner as follows: 5 grams of a sample of the polypropylene block-copolymer resin are introduced into 500 ml of paraxylene at 135° C. and the mixture is agitated sufficiently to dissolve all the soluble components (soluble polymers) in the sample completely. Then, the resulting mixture is cooled down to 23° C. and is stood still for 24 hours at this temperature. Then, the paraxylene solution phase is separated by centrifugation and the so-separated liquid phase is decanted into 1,000 ml of acetone to cause deposition of polymers. The deposited matter is after-treated by filtration, washing and drying, to obtain the component (X) soluble in paraxylene of 23° C. The precipitate phase from the centrifugal separation is subjected to a 6 hours' extraction using a Soxhlet extraction apparatus with cylindrical filter paper with 300 ml of paraxylene at 135° C. to separate it into a dissolved component and an insoluble component. While there occurs usually no insoluble component, solids, such as the catalyst residue etc., may occur in some cases in a quite trifle amount. The dissolved component is separated by decantation into 600 ml of acetone to deposit out the polymer component. The resulting deposit is after-treated by filtration, washing and drying, to obtain the component (Y) soluble in 135° C. paraxylene but insoluble in 23° C. paraxylene.

The component (X) soluble in 23° C. paraxylene is constituted mainly of the ethylene/α-olefin copolymer part (C) with some others including a part of the higher molecular weight polypropylene part (A) and/or the lower molecular weight polypropylene part (B) as well as by-products formed on the production of them.

The component (Y) soluble in 135° C. paraxylene but insoluble in 23° C. paraxylene is constituted mainly of the higher molecular weight polypropylene part (A) and the lower molecular weight polypropylene part (B) with some others including a part of the ethylene/α-olefin copolymer part (C) as well as by-products formed on the production thereof.

While it is favorable in general that the higher molecular weight polypropylene part (A) and the lower molecular weight polypropylene part (B) are composed exclusively of the structural unit derived from propylene, it is permissible that structural units derived from other monomers are included therein in a small proportion, for example, 10 mole % or lower, preferably 5 mole % or lower. For such other monomers, there may be enumerated, for example, α-olefins other than propylene, such as ethylene, 1-butene, 1-pentene, 1-hexene, 4-methyl-1-pentene, 3-methyl-1-pentene, 1-heptene, 1-octene, 1-nonene, 1-decene and 1-dodecene; vinyl compounds, such as styrene, vinylcyclopentane, vinylcyclohexane and vinylnorbornane; vinyl esters, such as vinyl acetate; unsaturated organic acids and derivatives thereof, such as maleic anhydride etc.; conjugated dienes; and non-conjugated polyenes, such as dicyclopentadiene, 1,4-hexadiene, dicyclooctadiene, methylenenorbornene and 5-ethylidene-2-norbornene. Among them, preference is given to ethylene and α-olefins having 4–10 carbon atoms. They may be present in combination of two or more in the polypropylene parts.

The α-olefin in the ethylene/α-olefin copolymer part (C) has 3–12 carbon atoms. Concrete examples thereof include propylene, 1-butene, 1-pentene, 1-hexene, 4-methyl-1-pentene, 3-methyl-l-pentene, 1-heptene, 1-octene, 1-nonene, 1-decene and 1-dodecene. Among them, preference is given to α-olefins of 3–8 carbon atoms, especially to propylene.

The content of ethylene in the ethylene/α-olefin copolymer part (C) may favorably be in the range from 20 to 40% by weight, preferably from 22 to 38% by weight, and the content of the α-olefin may favorably be in the range from 60 to 80% by weight, preferably from 62 to 78% by weight.

The polypropylene block-copolymer resin according to the present invention has, as properties for the entire resin, the characteristic features <<1>> and <<2>> given below:

<<1>> A melt flow rate (MFR), determined according to ASTM D 1238 at 230° C. under a load of 2.16 kg, of 0.01–5 g/10 min., preferably 0.1–5 g/10 min., more preferably 0.3–4 g/10 min.

<<2>> A molecular weight distribution expressed by Mw/Mn (weight-average molecular weight/number-average molecular weight), determined by gel permeation chromatography (GPC), of 6–20, preferably 8–20, and an Mz/Mw (Z-average molecular weight/weight-average molecular weight) of at least 3.5, preferably in the range from 3.5 to 6.

The above restrictions of the molecular weight distribution Mw/Mn value to 6–20 and of the molecular weight distribution Mz/Mw value to 3.5 or higher do mean that the polypropylene block-copolymer resin according to the present invention has a molecular weight distribution pattern exhibiting wider extension on the higher molecular weight side as compared with conventional polypropylene resins.

The polypropylene block-copolymer resin according to the present invention may favorably have, in addition to the above-mentioned characteristic features <<1>> and <<2>>, a further characteristic feature <<3>> given below: <<3>> An isotactic pentad fraction (mmmm-fraction) of the component (Y) soluble in paraxylene of 135° C. but insoluble in paraxylene of 23° C., determined by $^{13}$C-NMR, of at least 96%, preferably in the range from 97.0 to 99.5%.

The polypropylene block-copolymer resin according to the present invention having the above-mentioned characteristic feature <<3>> can be molded into formed articles which are superior in the stiffness due to their lower content of the atactic polypropylene component.

The isotactic pentad fraction (mmmm fraction) serves as a parameter of isotacticity of polypropylene, wherein the higher this value is, the higher is the isotacticity. An isotactic pentad fraction of 96% or higher does indicate that the isotacticity of the polypropylene is high. The above-mentioned isotactic pentad fraction (mmmm fraction) corresponds to the proportion of the isotactic chains as pentad units in the polypropylene molecular chains, which is determined using $^{13}$C-NMR and which is defined by the proportion of the number of propylene monomeric units each present at the center of each sequence of 5 monomeric propylene units bound successively with each other by meso-coupling in the polypropylene. This can be determined in the practice as the proportion of the mmmm peaks relative to the entire absorption peaks within the methyl carbon region in the $^{13}$C-NMR spectrum.

For the polypropylene block-copolymer resin composition according to the present invention, preference is given for those which has, in addition to the above characteristic features <<1>> and <<2>> or to the features <<1>> to <<3>>, further the following characteristic feature <<4>>:

<<4>> A molecular weight distribution of the component (Y) soluble in paraxylene of 135° C. but insoluble in paraxylene of 23° C., held under such a condition that, when the molecular weight distribution curve of the component (Y) on the molecular weight distribution diagram obtained by gel permeation chromatography (GPC) is divided at the maximum peak molecular weight into the higher molecular weight side half and the lower molecular weight side half, the ratio of the surface area $S_H$ for the higher molecular weight side half underlying under the said distribution curve relative to the surface area $S_L$ for the lower molecular weight side half underlying under the said distribution curve, namely, $S_H/S_L$, is at least 1.1, preferably at least 1.15, more preferably 1.15–2, and the proportion of the surface area for a higher molecular weight portion of molecular weights of at least $1.5 \times 10^6$ relative to the integral surface area underlying under the entire molecular weight distribution curve is at least 8%, preferably at least 8.2%, more preferably 8.2–40%.

The polypropylene block-copolymer resin according to the present invention having the above characteristic feature <<4>> has a high melt tension and is superior in the moldability with superior balance between the stiffness and the impact resistance.

The surface area on the higher molecular weight side $S_H$ mentioned above is the surface area of the higher molecular weight side half resulting from the molecular weight distribution diagram obtained by fractional analysis of the component (Y) soluble in 135° C. paraxylene but insoluble in 23° C. paraxylene by gel permeation chromatography (GPC), when subdividing the area confined between the molecular weight distribution curve and the axis of abscissa (molecular weight) thereof at the maximum peak molecular weight by a line parallel to the ordinate into two halves. The surface area $S_L$ stands for the lower molecular weight side half thereof.

The ratio of the surface area $S_H$ of the higher molecular weight side half to the surface area $S_L$ of the lower molecular weight side half ($S_H/S_L$) refers to the shape of the molecular weight distribution curve of the component (Y) soluble in 135° C. paraxylene but insoluble in 23° C. paraxylene. Thus, the case of $S_H/S_L>1$ corresponds to a molecular weight distribution curve in which a bulging of the curve indicating existence of polymers of higher molecular weights is present on the high molecular weight side of the curve. In the case of $S_H/S_L<1$, the molecular weight distribution curve has a bulging on the lower molecular weight side, indicating a content of lower molecular weight polymers. In the case of $S_H/S_L=1$, the molecular weight distribution curve has a shape in which the higher molecular weight side and the lower molecular weight side are balanced.

The proportion of the higher molecular weight side half of the polymer product corresponds to the ratio of the surface area in the molecular weight distribution diagram by gel permeation chromatography (GPC) for the molecular weights of $1.5 \times 10^6$ and higher confined between the molecular weight distribution curve and the axis of abscissa (molecular weight), relative to the entire surface area for all the molecular weights confined between the molecular weight distribution curve and the axis of abscissa. When this proportion exceeds a certain definite value, it means that a polymer fraction of molecular weights higher than $1.5 \times 10^6$ is present in the polypropylene block-copolymer resin. At least a part of this high molecular weight fraction consists of the higher molecular weight polypropylene part (A) having an intrinsic viscosity [η] of 6–13 dl/g.

For the polypropylene block-copolymer resin according to the present invention, preference is given for those which have, in addition to the characteristic features <<1>> and <<2 >>; <<1>> to <<3>>; <<1>>, <<2>> and <<4>>; or <<1>> to <<4>> mentioned above, further the following characteristic feature <<5>>:

<<5>> A proportion of the 124° C.-eluted segment of the component (Y) soluble in paraxylene of 135° C. but insoluble in paraxylene of 23° C., determined by cross-fractionating chromatography (CFC), of at least 6% by weight, preferably at least 6.5% by weight, more preferably 7–30% by weight, and a weight-average molecular weight (Mw) of the said 124° C.-eluted segment of at least $1.0 \times 10^6$, preferably at least $1.2 \times 10^6$, more preferably at least $1.3 \times 10^6$.

The polypropylene block copolymer resin according to the present invention having the above characteristic feature <<5>> has a high melt tension and is superior in the moldability with superior balance between the stiffness and the impact resistance due to the content of polypropylene of high crystallinity and high molecular weight.

The cross-fractionating chromatography (CFC) comprises a procedure of temperature-rising elution fractionation (TREF) for effecting a fractionation based on the polymer composition and a procedure of gel-permeation chromatography (GPC) for effecting fractionation based on the polymer molecular weight. The analysis using the CFC is carried out in the following manner: Thus, the component (Y) soluble in 135° C. paraxylene but insoluble in 23° C. paraxylene is first dissolved in o-dichlorobenzene (ODCB) at 135° C. completely. The resulting solution is passed through a TREF column which is filled with particles of an inert carrier substance and which is cooled gradually, in order to cause deposition of a thin polymer layer of the component (Y) on the surfaces of the inert carrier particles. Then, ODCB is passed through the TREF column at a first settled temperature, in order to cause the first eluted fraction from the TREF column. The first eluted fraction is injected into the GPC column continuously to determine the molecular weight of the first fraction of the component (Y), while the temperature of the TREF column is elevated to a second settled temperature and the second elution is carried out. After completion of the molecular weight distribution analysis of the first fraction in the above manner, the second eluted fraction from the TREF column is caused to be injected into the GPC column and the above procedures are repeated. By performing similar procedures repeatedly, detailed informations for each of the fractions eluted at different temperatures with respect to the molecular weight can be obtained. The elution temperatures in the TREF column may voluntarily be settled between 0° C. and 135° C. at a suitable interval of, for example, 3–5° C. The chromatography analysis is performed usually in a temperatures range including the temperatures given in Examples. The proportion of 124° C.-eluted segment of the component (Y) is defined by the percent proportion of the fraction eluted by ODCB at 124° C. relative to the entire eluted fractions and the weight-average molecular weight (Mw) of 124° C.-eluted segment is defined by this weight-average molecular weight of the 124° C.-eluted fraction determined as above.

The polypropylene block-copolymer resin according to the present invention may favorably have, in addition to the characteristic features <<1>> and <<2>>; <<1>> to <<3>>; <<1>>, <<2>> and <<4>>; <<1>> to <<4>>; <<1>>, <<2>> and <<5>>; <<1>> to <<3>> and <<5>>; <<1>>, <<2>>, <<4>> and <<5>>; or <<1>> to <<5>>, further the following characteristic feature <<6>>:

<<6>> A melt tension (MT), determined by flow tester at 230° C., in the range of 5–30 g, preferably 5–20g.

The polypropylene block copolymer resin according to the present invention having the above characteristic feature <<6>> has a high melt tension and is thus superior in the resistance to draw-down, in the deep-drawing ability and in the foaming performance.

The melt tension (MT) refers to a tension in molten state observed at 230° C., which is determined using a flow tester having an orifice of a diameter of 2.095 mm and a length of 8 mm by extruding the polypropylene block-copolymer resin in molten state through the orifice of the flow tester at a temperature of 230° C. at an extrusion velocity of 15 mm/min., wherein the resin strand extruded from the orifice is guided through a pulley provided with a sensor and is wound up around the pulley at a velocity of 10 m/min., in order to observe the force imposed onto the pulley.

The polypropylene block-copolymer resin according to the present invention provides for a high melt tension and is superior in the moldability with superior balance between the stiffness and the impact resistance, since it comprises the above specific components (A) to (C) in a specific proportion and can be subjected to a dissolution fractionation with paraxylene to permit the constituent components (X) and (Y) to be found in a specific proportion and since the melt flow rate and the molecular weight distribution thereof are each in the above-identified specific range.

The polypropylene block-copolymer resin according to the present invention may contain, as a prepolymer, 0.1% by weight or less, preferably 0.05% by weight or less, of a homopolymer or copolymer of branched olefins, for example, 3-methyl-1-butene, 3,3-dimethyl-1-butene, 3-methyl-1-pentene, 3-ethyl-1-pentene, 4-methyl-1-pentene, 3-methyl-1-hexene, 4-methyl-1-hexene, 4,4-dimethyl-1-hexene, 4,4-dimethyl-1-pentene, 4-ethyl-1-hexene, 3-ethyl-1-hexene, 3,5,5-trimethyl-1-hexene, vinylcyclopentane, vinylcyclohexane, vinylcycloheptane, vinylnorbornane, allylnorbornane, styrene, dimethylstyrene, allylbenzene, allyltoluene, allylnaphthalene and vinylnaphthalene. Among them, special preference is given to 3-methyl-1-butene and the like.

The polypropylene block-copolymer resin according to the present invention can be produced by effecting the polymerizations for the above (A) to (C) by a multistage polymerization of at least three stages in the presence of a catalyst for producing a highly stereospecific polypropylene. Thus, the polypropylene block-copolymer resin can be produced by polymerizing the monomers in a multistage polymerization of at least three stages in the presence of a catalyst for producing a highly stereospecific polypropylene, formed from (a) a solid catalyst component based on titanium containing magnesium, titanium, a halogen and an electron donor, (b) a catalyst component based on organometallic compound and (c) a catalyst component based on organosilicic compound having at least one group selected from the group consisting of cyclopentyl, cyclopentenyl, cyclopentadienyl and derivatives of them, wherein the said multistage polymerization comprises a stage of making up a higher molecular weight polypropylene part (A) having an intrinsic viscosity $[\eta]$ of 6–13 dl/g up to a proportion of 10–50% by weight with respect to the total amount of the finally obtained polypropylene block-copolymer resin, by polymerizing propylene under substantial absence of hydrogen, a stage of making up a lower molecular weight polypropylene part (B) having an intrinsic viscosity $[\eta]$ lower than 6 dl/g up to a proportion of 10–89% by weight with respect to the total amount of the finally obtained polypropylene block-copolymer resin, by polymerizing propylene, and a stage of making up an ethylene/α-olefin copolymer part (C) having an intrinsic viscosity $[\eta]$ of 0.1–13 dl/g up to a proportion of 1–40% by weight with respect to the total amount of the finally obtained polypropylene block-copolymer resin, by copolymerizing ethylene with an α-olefin.

For the practical way for adjusting the molecular weight and the intrinsic viscosity $[\eta]$ of the polypropylene, there is no special limitation, while it is preferable to use hydrogen as the molecular weight regulator.

As the sequential order for the production, it is preferable that the higher molecular weight polypropylene part (A) is produced in the first stage under substantial absence of hydrogen, then, in the second or the subsequent stage, the lower molecular weight polypropylene part (B) is produced and, finally, in the third or the subsequent stage, the ethylene/α-olefin copolymer part (C) is produced. While it may be possible to alter the polymerization order in such a manner that the lower molecular weight polypropylene part (B) is produced in the first stage polymerization, followed by the polymerization of the higher molecular weight polypropylene part (A) in the second or the subsequent stage, it should be necessary therefor to incorporate exhaustive elimination of the molecular weight regulator, such as hydrogen, included in the first stage reaction product before the initiation of polymerization in the second or subsequent stage(s), so that employment of an intricated apparatus becomes necessary and attainment of increase in the intrinsic viscosity $[\eta]$ of the polypropylene product in the second and the subsequent stages may not be easy.

A preferred process for producing a polypropylene block-copolymer resin according to the present invention comprises polymerizing the monomers by a multistage polymerization of at least three stages in the presence of a polymerization catalyst for producing a highly stereospecific polypropylene, formed from (a) a solid catalyst component based on titanium, containing magnesium, titanium, a halogen and an electron donor, (b) a catalyst component based on organometallic compound and (c) a catalyst component based on organosilicic compound having at least one group selected from the group consisting of cyclopentyl, cyclopentenyl, cyclopentadienyl and derivatives of them, wherein the said process comprises, making up, in one or more polymerization steps in the first stage, the higher molecular weight polypropylene part (A) having an intrinsic viscosity [72] of 6–13 dl/g, preferably 8–13 dl/g, more preferably 8.5–12 dl/g, up to a proportion of 10–50% by weight, preferably 10–45% by weight, more preferably 10–43% by weight, with respect to the total amount of the finally obtained polypropylene block-copolymer resin, by polymerizing propylene under substantial absence of hydrogen, making up, then, in one or more polymerization steps in the second stage, the lower molecular weight polypropylene part (B) having an intrinsic viscosity $[\eta]$ lower than 6 dl/g, preferably in the range from not higher than 6 dl/g to at the lowest 0.1 dl/g, more preferably from 5 to 0.1 dl/g (this intrinsic viscosity $[\eta]$ refers to that of the polypropylene produced in this stage only and not that of the integral polypropylene product including the polypropylene product formed in the preceding stage), up to a proportion of 10–89% by weight, preferably 35–80% by weight, more preferably 45–80% by weight, with respect to the total amount of the finally obtained polypropylene block-copolymer resin, by polymerizing propylene and making up, then, in one or more polymerization steps in the third stage, an ethylene/α-olefin copolymer part (C) having an intrinsic viscosity $[\eta]$ of 0.1–13 dl/g, preferably 1–11 dl/g, more preferably 1–9 dl/g (this intrinsic viscosity $[\eta]$ refers to that of the polypropylene produced in this stage only and not that of the integral polypropylene product including the polypropylene formed in the preceding stage), up to a proportion of 1–40% by weight, preferably 5–40% by weight, more preferably 5–35% by weight, with respect to the total amount of the finally obtained polypropylene block-copolymer resin, by co-polymerizing ethylene with an α-olefin.

The polymerization in each stage may be realized either continuously or in a batchwise or a semicontinuous process, though continuous process is preferred. The polymerization may be performed in a known practice, for example, by a gas phase polymerization or a liquid phase polymerization, such as solution polymerization, slurry polymerization or bulk polymerization. The polymerizations in the second and the subsequent stages may preferably be carried out subsequently to the first stage polymerization in a continuous manner. When a batch process is employed, the multistage polymerization can be effected in one single reactor.

The melt flow rate (MFR) of the polypropylene block-copolymer resin obtained as above may be decided by the intrinsic viscosities [η] and proportion of the higher molecular weight polypropylene part (A), the lower molecular weight polypropylene part (B) and the ethylene/α-olefin copolymer part (C) produced in the polymerization stages and, therefore, the MFR of the finally obtained polypropylene block-copolymer resin can be adjusted within the range defined in the above <<1>>, by selecting a suitable combination of the above-mentioned values.

By producing the polypropylene block-copolymer resin by effecting the multistage polymerization to build up the higher molecular weight polypropylene part (A), the lower molecular weight polypropylene part (B and the ethylene/α-olefin copolymer part (C) in the proportion defined as above, the finally obtained polypropylene block-copolymer resin will have contents of the constituent component (X) soluble in 23° C. paraxylene and of the constituent component (Y) soluble in 135° C. paraxylene but insoluble in 23° C. paraxylene in the proportion defined as above, without employing any special procedure.

By producing the polypropylene block-copolymer resin by effecting the multistage polymerization to build up the higher molecular weight polypropylene part (A), the lower molecular weight polypropylene part (B) and the ethylene/α-olefin copolymer part (C) in the proportion defined as above, the finally obtained polypropylene block-copolymer resin will have also a molecular weight distribution within the range of above <<2>>, without incorporating any special procedure.

By effecting a multistage polymerization of at least three stages as given above, the polypropylene block-copolymer resin according to the present invention having the superior properties as above can easily be produced in a simple and efficient way at a lower cost.

While it is favorable to carry out the polymerization of the monomer(s) in each stage in a continuous manner in order to produce the polypropylene block-copolymer resin according to the present invention in an efficient and economical way, a continuous polymerization may often bring about occurrence of gel formation. In order to suppress the gel formation as scarce as possible, it is favorable to carry out the polymerizations of the lower molecular weight polypropylene part (B) in the second or the subsequent stage and/or of the ethylene/α-olefin copolymer part (C) in the third or the subsequent stage using at lest two polymerization reactors, preferably at least three reactors, in a continuous manner in each reactor over a plurality of polymerization steps and to perform transference of the polymerization product from one reactor to another reactor also in a continuous way. By performing the polymerization continuously using a plurality of reactors, a polypropylene block-copolymer resin exhibiting scarce occurrence of gel formation can be obtained.

For the catalyst for producing the polypropylene block-copolymer resin according to the present invention, it is favorable to employ a catalyst for producing a highly stereospecific polypropylene formed from (a) a solid catalyst component based on titanium containing magnesium, titanium, a halogen and an electron donor, (b) a catalyst component based on organometallic compound and (c) a catalyst component based on organosilisic compound having at least one group selected from the group consisting of cyclopentyl, cyclopentenyl, cyclopentadienyl and derivatives of them.

The solid catalyst based on titanium (a) mentioned above can be prepared by bringing a magnesium compound (a-1), a titanium compound (a-2) and an electron donor (a-3) into contact with each other.

As the magnesium compound (a-1), there may be enumerated magnesium compounds having reducing ability, such as compounds having carbon-to-magnesium bond or magnesium-to-hydrogen bond, and magnesium compounds having no reducing ability, such as those represented by magnesium halogenides, alkoxymagnesium halides, aryloxymagnesium halides, alkoxymagnesiums, aryloxymagnesiums and carboxylic acid salts of magnesium.

In preparing the titanium-based solid catalyst component (a), it is preferable that, for example, a tetravalent titanium compound represented by the formula (1) given below is employed as the titanium compound (a-2).

$$Ti(OR)_gX_{4-g} \tag{1}$$

In the formula (1), R represents a hydrocarbon group, X denotes a halogen atom and g is in the range of $0 \leqq g \leqq 4$.

Concrete examples of the above titanium compound represented by the formula (1) include titanium tetrahalides, such as $TiCl_4$, $TiBr_4$ and $TiI_4$; alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitanium, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

For the electron donor (a-3) to be incorporated in the preparation of the titanium-based solid catalyst component (a), there may be exemplified alcohols, phenols, ketones, aldehydes, esters of organic or inorganic acids, organic acid halides, ethers, acid amides, acid anhydrides, ammonia, amines, nitriles, isocyanates, nitrogen-containing cyclic compounds and oxygen-containing cyclic compounds.

In contacting the magnesium compound (a-1), the titanium compound (a-2) and the electron donor (a-3) with each other, it is permissible that other reaction reagent, such as silicium, phosphorus or aluminum, may be caused to be present simultaneously and it is also permissible to incorporate a solid catalyst carrier for preparing a carrier-supported solid titanium catalyst component (a).

The titanium-based solid catalyst component (a) may be prepared by any technique including known one. Examples of such preparation technique are given below in a brief description:

(1) A technique in which a solution of the magnesium compound (a-1) in a hydrocarbon solvent containing the electron donor (the liquefying agent) (a-3) is brought into contact with the organometallic compound to cause a reaction to precipitate solid matter which is then, or in the course of precipitation, brought into contact with the titanium compound (a-2) to cause reaction.

(2) A technique in which a complex composed of the magnesium compound (a-1) and the electron donor (a-3) is brought into contact with the organometallic compound to cause reaction and, then, the titanium compound (a-2) is caused to contact and react therewith.

(3) A technique in which the contacted product from the contact of an inorganic carrier with an organomagnesium compound (a-1) is brought into contact with the titanium compound (a-2) and with the electron donor (a-3) to cause reaction therebetween. Here, it is permissible to bring the product of contact of the carrier with the magnesium compound into contact with a halogen-containing compound and/or an organometallic compound preliminarily.

(4) A technique, wherein a solid carrier, which is obtained from a mixture containing a solution of the magnesium compound (a-1), the electron donor (a-3) and the carrier in a liquid medium of the liquefying agent and, optionally, a hydrocarbon solvent and on which the magnesium compound (a-1) is supported, is contacted with the titanium compound (a-2).

(5) A technique in which a solution containing the magnesium compound (a-1), the titanium compound (a-2), the electron donor (a-3) and, optionally, a hydrocarbon solvent is brought into contact with a solid carrier.

(6) A technique in which an organomagnesium compound (a-1) in liquid form and a halogen-containing titanium compound (a-2) are brought into contact with each other. In this case, the electron donor (a-3) is used at least once.

(7) A technique in which an organomagnesium compound (a-1) in liquid form and a halogen-containing titanium compound (a-2) are brought into contact with each other, whereupon the resulting product is caused to contact with the titanium compound (a-2). In this case, the electron donor (a-3) is used at least once.

(8) A technique in which an alkoxyl group-containing magnesium compound (a-1) is brought into contact with a halogen-containing titanium compound (a-2). In this case, the electron donor (a-3) is used at least once.

(9) A technique in which a complex composed of an alkoxyl group-containing magnesium compound (a-1) and of the electron donor (a-3) is brought into contact with the titanium compound (a-2).

(10) A technique in which a complex composed of an alkoxyl group-containing magnesium compound (a-1) and the electron donor (a-3) is brought into contact with an organometallic compound, whereupon the resulting product is brought into contact with the titanium compound (a-2).

(11) A technique in which the magnesium compound (a-1), the electron donor (a-3) and the titanium compound (a-2) are brought into contact with each other in a voluntary order to cause reactions therebetween. It is permissible to incorporate a pretreatment of each reaction component before these reactions using a reaction assistant, such as an electron donor (a-3), an organometallic compound, a halogen-containing silicium compound or the like.

(12) A technique in which a liquid magnesium compound (a-1) exhibiting no reducing function is caused to react with a liquid titanium compound (a-2) in the presence of the electron donor (a-3) to deposit a solid magnesium/titanium composite product.

(13) A technique in which the reaction product obtained in the above (12) is further reacted with the titanium compound (a-2).

(14) A technique in which the reaction product obtained in the above (11) or (12) is further reacted with the electron donor (a-3) and with the titanium compound (a-2).

(15) A technique in which a solid mixture obtained by crushing the magnesium compound (a-1), the titanium compound (a-2) and the electron donor (a-3) is treated with any of an elementary halogen, a halogen compound or an aromatic hydrocarbon. In this case, it is permissible to incorporate a process step of crushing either the magnesium compound (a-1) solely or a complex composed of the magnesium compound (a-1) and of the electron donor (a-3) or the magnesium compound (a-1) and the titanium compound (a-2). It is also permissible to subject the crushed product to a pretreatment with a reaction assistant, followed by an after-treatment with, such as, an elementary halogen. As the reaction assistant, for example, an organometallic compound or a halogen-containing silicium compound, may be employed.

(16) A technique in which the magnesium compound (a-1) is crushed and the resulting crushed product is brought into contact with the titanium compound (a-2). Upon crushing and/or contacting the magnesium compound (a-1), an electron donor (a-3) may, if necessary, be employed together with a reaction assistant.

(17) A technique in which the product obtained in any of the above (11) - (16) is treated with an elementary halogen or a halogen compound or with an aromatic hydrocarbon.

(18) A technique in which a reaction product resulting after the metal oxide, the organomagnesium compound (a-1) and the halogen-containing compound are contacted with each other is caused to contact with the electron donor (a-3) and with, preferably, the titanium compound (a-2).

(19) A technique in which a magnesium compound (a-1), such as a magnesium salt of an organic acid, an alkoxymagnesium or an aryloxymagnesium, is brought into contact with the titanium compound (a-2), with the electron donor (a-3) and, if necessary, further with a halogen-containing hydrocarbon.

(20) A technique in which a solution of the magnesium compound (a-1) and an alkoxytitanium in a hydrocarbon solvent is brought into contact with the electron donor (a-3) and, if necessary, further with the titanium compound (a-2). In this case, it is favorable that a halogen-containing compound, such as a halogen-containing silicium compound, is caused to co-exist.

(21) A technique in which a liquid magnesium compound (a-1) exhibiting no reducing function is caused to react with an organometallic compound to cause a composite solid product of magnesium/metal (aluminum) to deposit out and, then, the product is reacted with the electron donor (a-3) and with the titanium compound (a-2).

As the organometallic compound catalyst component (b) mentioned above, those which contain a metal selected among the Group I to Group III of the periodic table are preferred. Concretely, there may be exemplified organoaluminum compounds, complex alkyl compounds with Group I metal and aluminum, organometallic compounds of Group II metals and so on, represented by the formulae given below:

An organoaluminum compound (b-1) represented by the formula $$R^1_m Al(OR^2)_n H_p X_q$$

In which $R^1$ and $R^2$ represent each a hydrocarbon group having usually 1–15 carbon atoms, preferably 1–4 carbon atoms, which may be identical with or different from each other, X denotes a halogen atom, m is in the range $0 < m \leq 3$, n is in the range 0≦n<3, p is in the range 0≦p<3 and q is in the range 0≦q<3, wherein m+n+p+q=3.

An alkylated complex of a Group I metal and aluminum (b-2) represented by the formula $$M^1AlR^1_4$$

In the formula, $M^1$ is Li, Na or K and $R^1$ has the same meaning as above.

A dialkylated compound of Group II or Group III metal (b-3) represented by the formula $$R^1R^2M^2$$

In the formula, $R^1$ and $R^2$ have the same meanings as above and $M^2$ is Mg, Zn or Cd.

As the organoaluminum compound (b-1), there may be enumerated, for example, those which are represented by the formula $$R^1_mAl(OR^2)_{3-m},$$

in which $R^1$ and $R^2$ have the same meanings as above and m is preferably of 1.5≦m≦3; those which are represented by the formula $$R^1_mAlX_{(3-m)},$$

in which $R^1$ has the same meaning as above, X stands for a halogen and m is preferably of 0<m<3; those which are represented by the formula $$R^1_mAlH_{(3-m)},$$

in which $R^1$ has the same meaning as above and m is preferably of 2≦m<3; and those which are represented by the formula $$R^1_mAl(OR^2)_nX_q,$$

in which $R^1$ and $R^2$ have the same meanings as above, X stands for a halogen, m is in the range 0<m≦3, n is in the range 0≦n<3 and q is in the range 0≦q<3, wherein m+n+q=3.

Concrete examples of the organosilicic compound catalyst component (c) include organosilicic compounds represented by the formula (2) given below $$SiR^1R^2_n(OR^3)_{(3-n)} \qquad (2)$$

In the formula (2), n is an integer of 0, 1 or 2, $R^1$ is a group selected from the group consisting of cyclopentyl, cyclopentenyl, cyclopentadienyl and their derivatives and $R^2$ and $R^3$ denote each a hydrocarbyl radical.

As the concrete examples of $R^1$ in the formula (2), there may be enumerated cyclopentyl and derivatives thereof, such as cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tert-butylcyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl and 1-methyl-1-cyclopentylethyl; cyclopentenyl and derivatives thereof, such as cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-di-methyl-3-cyclopentenyl, 2,3,4,5-tetramethyl-3-cyclopentenyl and 2,2,5,5-tetramethyl-3-cyclopentenyl; cyclopentadienyl and derivatives thereof, such as 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2,2-dimethyl-2,4-cyclopentadienyl, 2,3-dimethyl-2,4-cyclopentadienyl, 2,5-dimethyl-2,4-cyclopentadienyl and 2,3,4,5-tetramethyl-2,4-cyclopentadienyl; derivatives of cyclopentyl, of cyclopentenyl and of cyclopentadienyl, such as indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6,7-tetrahydro-indenyl, 4,5,6,7-tetrahydro-2-indenyl, 4,5,6,7-tetrahydro-1-methyl-2-indenyl, 4,5,6,7-tetrahydro-1,3-dimethyl-2-indenyl and fluorenyl.

Concrete examples of the hydrocarbyl groups $R^2$ and $R^3$ in the formula (2) include alkyls, cycloalkyls, aryls and aralkyls. If two or more groups are present for $R^2$ or/and $R^3$, the groups of $R^2$, or/and of $R^3$ may either be identical with or different from each other, wherein $R^2$ may either be identical with or different from $R^3$. The groups $R^1$ and $R^2$ in the formula (2) may be coupled with each other via a bridging group, such as alkylene.

Among the organosilicic compounds represented by the formula (2), preference is given to those in which $R^1$ stands for cyclopentyl, $R^2$ represents an alkyl or cyclopentyl and $R^3$ stands for an alkyl, especially methyl or ethyl.

Concrete examples of the organosilicic compounds represented by the formula (2) include trialkoxysilanes, such as cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane, and fluorenyltrimethoxysilane; dialkoxysilanes, such as dicyclopentyldimethoxysilane, bis(2-methylcyclopentyl)-dimethoxysilane, bis(3-tert-butylcyclopentyl) dimethoxysilane, bis(2,3-dimethylcyclopentyl) dimethoxysilane, bis(2,5-dimethylcyclopentyl) dimethoxysilane, dicyclopentyldiethoxysilane, dicyclopentenyldimethoxysilane, di(3-cyclopentenyl) dimethoxysilane, bis(2,5-dimethyl-3-cyclopentenyl) dimethoxysilane, di-2,4-cyclopentadienyldimethoxysilane, bis(2,5-dimethyl-2,4-cyclopentadienyl)-dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl) dimethoxysilane, cyclopentadienylindenyldimethoxysilane, difluorenyldimethoxysilane, cyclopentylfluorenyldimethoxysilane and indenylfluorenyldimethoxysilane; monoalkoxysilanes, such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentyl-cyclopentadienylmethoxysilane and diindenylcyclopentylmethoxysilane; and others, such as ethylenebiscyclopentyldimethoxysilane.

For producing the polypropylene block-copolymer resin according to the present invention using a catalyst composed of the solid titanium catalyst component (a), the organometallic compound catalyst component (b) and the organosilicic compound catalyst (c), a prepolymerization may preliminarily be incorporated. In the prepolymerization, an olefin is polymerized in the presence of a solid titanium catalyst component (a), an organometallic compound catalyst component (b) and, if necessary, an organosilicic compound catalyst component (c).

For the olefin to be pre-polymerized, there may be used, for example, a linear olefin, such as ethylene, propylene, 1-butene, 1-octene, 1-hexadecene or 1-eicosene; or an olefin having branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane or allyltrialkylsilanes. They may also be co-polymerized.

The prepolymerization may favorably be carried out in such a manner that the polymerized product will be formed in an amount of about 0.1–1,000 g, preferably 0.3–500 g per one gram of the solid titanium catalyst component (a). If the pre-polymerized amount is too large, the efficiency for producing the (copolymer in the inherent polymerization may decrease. In the prepolymerization, the catalyst may be used at a concentration considerably higher than that in the system of the inherent polymerization.

Upon the multistage polymerization of propylene using the catalyst as above, it is permissible to subject propylene to a copolymerization with other comonomer(s) mentioned above in any one stage or in all the stages, so long as the purpose of the present invention is not obstructed.

For the inherent polymerization, it is favorable to use the solid titanium catalyst component (a) (or the catalyst for the prepolymerization) in an amount of about 0.0001–50 mmol, preferably about 0.001–10 mmol, calculated as titanium atom, per one liter of the polymerization volume. The organometallic compound catalyst component (b) may favorably be used in an amount of about 1–2,000 moles, preferably about 2–500 moles, as calculated for the atomic weight of the metal per one mole of titanium atom in the polymerization system. The organosilicic compound catalyst component (c) may favorably be used in an amount of about 0.001–50 moles, preferably about 0.01–20 moles, per one mole of the metal atom of the organometallic compound catalyst component (b).

As the polymerization medium, inert hydrocarbon may be used and propylene in liquid state may be used therefor. The polymerization condition may be selected adequately within the ranges for the polymerization temperature of about –50° C. to +200° C., preferably about 20° C. to 100° C., and for the polymerization pressure of normal pressure to 9.8 MPa gauge, preferably about 0.2 to 4.9 MPa gauge.

It is permissible that the polypropylene block-copolymer resin according to the present invention contains, if necessary, other polymer(s) and/or additives etc., so long as the purpose of the present invention is not obstructed. As the said other polymers, polypropylenes which are not included in the polypropylene block-copolymer resin according to the present invention, for example, homopolymers of propylene and propylene/α-olefin copolymers, are enumerated. As others, there may be enumerated, for example, low density polyethylene (LDPE), linear low density polyethylene (LLDPE), high density polyethylene (HDPE), polyolefins, rubber components and engineering plastics.

For example, the polypropylene block-copolymer resin according to the present invention may contain, for improving the impact strength, a rubber component, such as an ethylene/α-olefin copolymer rubber or a rubber based on a conjugated diene, in an adequate amount. Concrete examples of such a rubber component include non-crystalline or low-crystalline α-olefin copolymers having no diene component, such as ethylene/propylene copolymer rubber, ethylene/1-butene copolymer rubber, ethylene/1-octene copolymer rubber and propylene/ethylene copolymer rubber; ethylene/propylene/dicyclopentadiene copolymer rubber; ethylene/propylene/non-conjugated diene copolymer rubbers, such as ethylene/propylene/1,4-hexadiene copolymer rubber, ethylene/propylene/cyclooctadiene copolymer rubber, ethylene/propylene/methylenenorbornene copolymer rubber and ethylene/propylene/ethylidenenorbornene copolymer rubber; and ethylene/butadiene copolymer rubber.

As the additives, there may be enumerated, for example, nucleating agent, antioxidant, hydrochloric acid absorber, heat stabilizer, anti-weathering agent, light stabilizer, UV-absorber, slipping agent, anti-blocking agent, antifogging agent, lubricating agent, antistatic agent, flame retardant, pigments, colorants, dispersant, copper-sequestering agent, neutralizing agent, foaming agent, plasticizer, bubble preventing agent, cross-linking agent, flowability improving agent such as peroxides, weld strength improving agent, natural petroleum oils, synthetic oils, waxes and inorganic fillers such as talc etc.

The polypropylene block-copolymer resin according to the present invention may contain, as a nucleating agent, the above-mentioned prepolymer or an inherent nucleating agent chosen among known ones or, further, the above-mentioned prepolymer together with an inherent nucleating agent. By inclusion or addition of a nucleating agent, micronization of the crystal grains and increment of the crystallization velocity are attained, whereby a high speed molding can be realized. For example, when a nucleating agent is contained in the polypropylene block-copolymer resin according to the present invention, it is possible to provide for a micronization of the crystals together with attainment of increased crystallization velocity to permit high speed molding. For the nucleating agent other than the prepolymer mentioned above, various nucleating agent known previously, such as nucleating agents based on phosphate, sorbitol, metal salts of aromatic or aliphatic carboxylic acids and inorganic substances, may be employed without any restriction.

The polypropylene block-copolymer resin according to the present invention have a high melt tension (MT) and are superior in the moldability and in the balance between the stiffness and the impact resistance, so that they can be processed into molded articles of not only small sizes but also large sizes, which have better appearance and are difficultly deformable. Therefore, the polypropylene block-copolymer resin according to the present invention can be used without any limitation in various application fields where the above-mentioned characteristic properties are required. Thus, they are adapted for use as the starting material of, for example, blow-molded articles, vacuum-formed articles, pneumatically molded articles, calendered articles, stretched films, inflation films, extrusion molded articles and foamed articles, while they can be used as the starting resin for other molded articles and for other molding techniques.

In blow-molding a hollow article from the polypropylene block-copolymer resin according to the present invention, the parison will scarcely suffer from occurrence of drawdown and from occurrence of waving and rough surface even in a large-sized parison, since the polypropylene block-copolymer resin to be blow-molded has a high melt tension. Therefore, blow-molded articles of not only small size but also large size can be obtained easily with better appearance in an efficient manner. For example, a large-sized blow-molded article, such as bumper or spoiler of automobile produced from a parison having a weight of 5 kg or more, can be produced efficiently at a high speed. Due to the superior balance between the stiffness and the impact resistance, the resulting blow-molded articles are scarcely deformable.

For producing the blow-molded article from the above-mentioned polypropylene block-copolymer resin according to the present invention, known blow molding apparatuses can be employed. The molding conditions may also be those known ones.

In the case of extrusion blow molding, a blow-molded article can be obtained by extruding the polypropylene block-copolymer resin according to the present invention in a molten state at a resin temperature of, for example, 170 to 300° C., preferably 170 to 270° C., through a die to form a tubular parison and placing this parison in a mold having the shape corresponding to that of the molded article, whereupon air is blown into this parison at a resin temperature of 130 to 300° C., preferably 200 to 270° C., in order to fit it to the mold inner face to obtain the contemplated blow-molded article. The extension magnification may preferably be 1.5- to 5-fold in the lateral direction.

In the case of injection blow molding, the polypropylene block-copolymer resin according to the present invention is injected into a mold at a resin temperature of, for example, 170 to 300° C., preferably 170 to 270° C., to form a parison, whereupon the parison is placed in a mold of a shape corresponding to that of the molded article and air is blown into the parison in order to fit it to the mold at a resin temperature of 120 to 300° C., preferably 140 to 270° C., to obtain the blow-molded article. The extension magnification may preferably be 1.1- to 1.8-fold in the longitudinal direction and 1.3- to 2.5-fold in the lateral direction.

In the case of stretching blow molding, the polypropylene block-copolymer resin according to the present invention is injected into a mold at a resin temperature of, for example, 170 to 300° C., preferably 170 to 280° C., to form a parison which is then preliminarily blown under a predetermined condition, whereupon this pre-blown parison is subjected to a stretching blow molding at a resin temperature of 80 to 200° C., preferably 100 to 180° C., to obtain the blow-molded article. The extension magnification may preferably be 1.2- to 4.5-fold in the longitudinal direction and 1.2- to 8-fold in the lateral direction.

Concrete examples of the blow-molded article include automobile exterior furnishings, such as spoiler, bumper, side molding, front grill guard and bumper guard; automobile interior furnishings, such as sun visor, radiator tank, washer tank, ducts, distributor, evaporator casing, console box, indicator panel and door trim; vessels, such as kerosene tank, vessels for foods, shampoo cartridge, containers for cosmetics, containers for detergents, vessels for drugs and containers for toner; and others, such as toys and containers. Among them, large-sized blow-molded articles with parison weights of 5 kg and higher, in particular, automobile exterior furnishings, such as bumper and spoiler, may favorably be enumerated.

Vacuum or pressure-formed article is produced by processing a sheet or film made of the polypropylene block-copolymer resin according to the present invention by vacuum forming or pressure forming. Due to the high melt tension of the starting polypropylene block-copolymer resin, the sheet or film can sufficiently fit the shape of the mold inner face upon the vacuum or pressure forming. Therefore, it can be processed by vacuum or pressure forming at a higher speed even in a large-sized article and permits deep drawing while providing superior strength and better appearance.

For producing the vacuum- or pressure-formed article from the polypropylene block-copolymer resin according to the present invention, known apparatuses for vacuum forming or for pressure forming can be used. The forming conditions may also be those known ones. Thus, for example, a formed article in a form of sheet made of the polypropylene block-copolymer resin according to the present invention is held on a mold having a shape corresponding to that to be assumed at a temperature of 180–300° C., preferably 180–270° C., more preferably 180–250° C., and, then, by evacuating air from the mold or by introducing a compressed air into the mold, contemplated vacuum- or pressure-formed article can be obtained.

Concrete examples of the vacuum- or pressure-formed article according to the present invention include automobile interior furnishings, such as roof liner, refrigerator interior articles, laundry machine interior and exterior parts, jerry packages, instant lunch package, trays, trays for foods, foamed trays for foods, package for bean curd, cups, bags, heat resistant trays for electronic oven, protecting cases for machines and packaging cases for merchandizes.

Calendered article is produced by calendering the polypropylene block-copolymer resin according to the present invention. Due to the high melt tension of the starting polypropylene block-copolymer resin according to the present invention, sheet or film superior in the strength and gloss exhibiting scarce irregularity of thickness can easily be calendered at high speed.

For producing the calendered article from the polypropylene block-copolymer resin according to the present invention, known calendering apparatuses can be employed. The calendering conditions may also be known ones. For example, using a calendering machine of, for example, the series type, L-shaped type, reverse L-shaped type or Z-shaped type, calendering can be realized at a resin temperature of 180–300° C., preferably 180–270° C., and at a heating roll temperature of 170–300° C., preferably 170–270° C. It is also possible to produce an artificial leather, waterproof cloth or various laminates by feeding paper or cloth to the roll upon calendering.

Concrete examples of the calendered article include original sheets for processing into various cards and original sheets for producing household commodities.

Extrusion molded article is produced by extrusion-molding the polypropylene block-copolymer resin according to the present invention. Due to the high melt tension of the starting polypropylene block-copolymer resin according to the present invention, it can be subjected to extrusion molding at high speed and can be processed into a large-sized article having a high strength. In the case where the extrusion-molded article is an extruded sheet, the thickness thereof may range usually from 0.3 to 5 mm, preferably from 0.5 to 3 mm.

For producing extrusion-molded articles from the polypropylene block-copolymer resin according to the present invention, known extrusion apparatuses can be employed. For example, an extruding machine, such as a single screw extruder, kneader extruder, ram extruder or gear extruder, can be used to produce an extruded sheet. The extruder may be provided with a circular die, a profiled die or a T-die. The conditions of extrusion may also be known ones, while it is preferable to realize the extrusion under the condition such as given below. For example, using an extruder provided with a T-die, a sheet may favorably be extruded at a resin temperature of 180–300° C., preferably 180–270° C., and at a T-die temperature of 180–300° C., preferably 180–290° C. For cooling the extruded article, water can be used, while other means, such as air-knife or cooling roll, may also be employed. It is also possible to produce an artificial leather, waterproof cloth or various laminates by feeding paper or cloth to the roll upon the extrusion.

Concrete examples of the extrusion-molded article include architectural furnishings, such as eaves gutter, curtain rail, window frame, shelves and door; extruded profile articles, such as cable ducts, roller shutters and shutters; and others, such as tubes, pipes, electric cables (sheathed), films, sheets, boards, fiber and tape.

Stretched film is a monoaxially or biaxially stretched film produced by stretching a sheet or film made of the polypropylene block-copolymer resin according to the present invention. Due to the high melt tension of the starting polypropylene block-copolymer resin according to the present invention, the resulting stretched film is superior in the thickness accuracy and can be produced at high speed stably without suffering from breaking of the film during the stretching. The stretched film has a thickness of, usually, 5–200 μm, preferably 10–120 μm. The stretching magnification ratio of the stretched film for biaxially stretched film is in the range of, usually, 9- to 100-fold, preferably 40- to 70-fold, and that for monoaxially stretched film in the range of, usually, 2- to 10-fold, preferable 2- to 6-fold.

For producing the stretched film from the polypropylene block-copolymer resin according to the present invention, known stretching apparatuses can be employed. For example, a tenter (with axial/lateral stretching or lateral/axial stretching), a simultaneous biaxial stretching machine or a monoaxial stretching machine may be enumerated. The conditions of stretching may also be known ones. For example, by melt-extruding the polypropylene block-copolymer resin according to the present invention at a temperature of 200–280° C., preferably 240–270° C., and stretching the resulting film up to 2- to 10-fold, preferably 2- to 6-fold in axial direction, a monoaxially stretched film can be produced. In an alternative technique, a biaxially stretched film can be obtained by melt-extruding the polypropylene block-copolymer resin according to the present invention at a temperature of 200–280° C., preferably 240–270° C., and stretching the resulting film under an atmosphere of 120–200° C., preferably 130–180° C., up to 3- to 10-fold in axial direction and up to 3- to 10-fold in lateral direction.

Concrete examples of the stretched film include packaging films for foods, such as candy and vegetable; shrinkable films for wrapping cup-noodle etc.; packaging films for packaging textile goods, such as utility shirt, T-shirt and panty stocking; films for office supplies, such as clear file, clear sheet; and others, such as capacitor film, cigarette packaging film, film for instant packaging, decoration film and packaging tape.

Inflation film is produced by subjecting the polypropylene block-copolymer resin according to the present invention to an inflation molding. Due to the high melt tension of the starting polypropylene block-copolymer resin according to the present invention, the balloon formed upon the inflation molding is held stable. Therefore, the inflation film exhibits scarce decrease in the strength and in the transparency, which may be seen in the film made of a resin blended with a high-pressure low density polyethylene, and is superior in the balance between the stiffness and the impact resistance and in the transparency with permission of high-speed molding.

For producing the inflation film from the polypropylene block-copolymer resin according to the present invention, known inflation-molding apparatuses can be employed. The conditions for the molding may also be those known ones. For example, a condition of a resin temperature of 180–240° C., an air cooling in one or two stages at an air temperature of 10–40° C., a rolling-up velocity of 5–200 m/min. and an inflation ratio of 1.1- to 5-fold may be employed. The inflation film may have a thickness in the range of 10 μm to 1 mm, preferably 15 μm to 0.5 mm.

Concrete examples of inflation film include packaging films for foods, such as candy and vegetable; packaging films for packaging textile goods, such as utility shirt, T-shirt and panty stocking; films for office supplies, such as clear file, clear sheet; and others, such as cleaning bag, films for fashion bags, films for agricultural uses and for cup.

Foamed article is produced by causing the polypropylene block-copolymer resin according to the present invention to foam up. To the technique for effecting the foaming, no special limitation is imposed and known techniques, such as foaming under normal pressure, extrusion foaming, pressure foaming, injection foaming and beads forming, can be employed. Due to the high melt tension of the starting polypropylene block-copolymer resin according to the present invention, foaming can be effected at a high foaming-up ratio in a uniform cell texture even for a large-sized foamed article. Foamed article can be produced by heating a foamable composite composed of the polypropylene block-copolymer resin according to the present invention, foaming agent (propellant) and, on requirement, foaming nucleating agent, organic peroxide, cross linking assistant and so on.

As the foaming agent, chemicals which exist as liquid or solid at normal temperature and develop a gas upon heating can be used. Concretely, there may be employed, for example, azodicarbonamide, barium azodicarboxylate, N,N'-dinitrosopentamethylenetetramine, 4,4-oxybis(benzenesulfonylhydrazide), diphenylsulfon-3,3-disulfonylhydrazide, p-toluenesulfonyl semicarbazide, trihydrazinotriazine, biurea and zinc carbonate. Among them, preference is given to compounds which develop a large amount of gas and have a gas development cease temperature sufficiently lower than the temperature for initiating thermal deterioration of the polypropylene block-copolymer resin according to the present invention, for example, azodicarbonamide, N,N'-dinitrosopentamethylenetetramine and trihydrazinotriazine. These foaming agents may preferably be present in the polypropylene block-copolymer resin according to the present invention in a proportion of, favorably, 1–20 parts by weight, preferably 2–5 parts by weight, per 100 parts by weight of the block-copolymer resin.

Foaming agents other than the above may also be employed, for example, gases existing in gas phase at normal temperature and normal pressure, such as carbon dioxide, nitrogen, argon, helium, propane, butane, chlorofluorocarbons (flons), methane, ethane, oxygen and air; low boiling volatile foaming agents (low boiling organic solvents), such as n-pentane, isopentane, n-hexane, n-heptane, n-octane, cyclopentane, cyclohexane, methanol, ethanol, 1-butanol, 3-pentanol, acetone, methyl ethyl ketone and diethyl ether. Among them, preference is given to carbon dioxide gas and nitrogen gas.

The nucleating agent for the foaming is used to control the diameter and number of gas bubbles of the foamed article. Concrete examples of the foaming nucleating agent include talc, sodium bicarbonate, citric acid, calcium carbonate and ammonium carbonate.

The organic peroxide mentioned above is used for attaining cross-linking of the foamed product. As the organic peroxide, there may be employed in most cases organic peroxides and organic peroxyesters. Concrete examples therefor include the following compounds:

3,5,5-trimethylhexanoyl peroxide, octanoyl peroxide, decanoyl peroxide, lauroyl peroxide, succinic acid peroxide, acetyl peroxide, tert-butyl peroxy(2-ethyl hexanoate), m-toluoyl peroxide, benzoyl peroxide, tert-butyl peroxyisobutyrate, 1,1-bis(tert-butylperoxy)3,5,5-trimethylcyclohexane, 1,1-bis(tert-butylperoxy) cyclohexane, tert-butyl peroxymaleate, tert-butylperoxylaurate, tert-butylperoxy-3,5,5-trimethyl cyclohexanoate, cyclohexanone peroxide, tert-butylperoxyisopropyl carbonate, 2,5-dimethyl-2,5-di(benzoylperoxy)hexane, tert-butyl peroxyacetate, 2,2-bis(tert-butylperoxy)butane, tert-butyl peroxybenzoate, n-butyl4,4-bis(tert-butylperoxy) valerate, di-tert-butyl peroxyisophthalate, methyl ethyl ketone peroxide, α, α'-bis(tert-butylperoxyisopropyl)benzene, dicumyl peroxide, 2,5-dimethyl-2,5-di(tert-butylperoxy) hexane, tert-butyl-cumyl peroxide, diisopropylbenzene hydroperoxide, ditert-butyl peroxide, p-menthane hydroperoxide, 2,5-dimethyl-2,5-di(tert-butylperoxy)-3-hexyne, 1,1,3,3-tetramethylbutyl hydroperoxide, 2,5-dimethylhexane-2,5-dihydroperoxide, cumene hydroperoxide and tert-butylhydroxy peroxide.

Among them, preference is given to 1,1-bis(tert-butylperoxy)cyclohexane, tert-butylperoxy maleate, tert-butylperoxy laurate, tert-butylperoxy-3,5,5-trimethyl cyclohexanoate, cyclohexanone peroxide, tert-butylperoxyisopropyl carbonate, 2,5-dimethyl-2,5-di(benzoylperoxy)hexane, tert-butylperoxy acetate, 2,2-bis(tert-butylperoxy)butane, tert-butylperoxy benzoate, n-butyl-4,4-bis(tert-butylperoxy) valerate, di-tert-butylperoxy isophthalate, methyl ethyl ketone peroxide, α, α'-bis(tert-butylperoxyisopropyl)benzene, dicumyl peroxide, 2,5-dimethyl-2,5-di(tert-butylperoxy)hexane, tert-butylcumyl peroxide, diisopropylbenzene hydroperoxide, di-tert-butyl peroxide, p-menthane hydroperoxide, 2,5-dimethyl-2,5-di(tert-butylperoxy)-3-hexyne, 1,1,3,3-tetramethylbutyl hydroperoxide, 2,5-dimethylhexane-2,5-dihydro peroxide, cumene hydroperoxide and tert-butylhydroxy peroxide. The organic peroxide may favorably be used in an amount of 0.01–5 parts by weight, preferably 0.01–1 part by weight, per 100 parts by weight of the polypropylene block-copolymer resin according to the present invention.

The cross linking assistant functions such that a hydrogen atom in the polypropylene is drawn out by the organic peroxide and the thereby produced polymer radical will react with the cross linking assistant before the polymer radical comes to cleavage to thereby stabilize the polymer radical and, at the same time, to increase the cross linking efficiency. As the cross linking assistant functioning as above, there may be used usually unsaturated compounds having one or two or more double bonds, oximes, nitroso compounds and maleimides each solely or in a combination of two or more of them.

As the cross linking assistant, there may be enumerated concretely, for example, divinyl compounds, such as divinylbenzene and diallyl phthalate; polyfunctional methacrylates and acrylates, such as 1,6-hexanediol dimethacrylate, ethylene glycol dimethacrylate, trimethylolpropane trimethacrylate, pentaerythritol triacrylate and neopentyl glycol diacrylate; cyanurates and isocyanurates, such as triallyl cyanurate and triallyl isocyanurate; oximes, such as quinone dioxime and benzoquinone dioxime; nitroso compounds, such as p-nitrosophenol and the like; and maleimides, such as N,N-methaphenylenebismaleimide and so on. Among them, preferance is given to 1,6-hexanediol dimethacrylate and neopentyl glycol diacrylate.

The foamed article may have any shape. It may be present in a form of, for example, block, sheet and monofilament. For producing the foamed article from the polypropylene block-copolymer resin according to the present invention, known foam-molding apparatus can be used. The molding conditions may also be known ones.

For example, a foamed article in a form of sheet can be obtained by blending the polypropylene block-copolymer resin according to the present invention, a foaming agent which is present in liquid or solid state at normal temperature and which develops a gas by heating, an organic peroxide, a cross linking assistant and, if necessary, a heat stabilizer on a mixing apparatus, such as Henschel mixer, V-blender, ribbon blender or tumbler blender, kneading the resulting blend using an extruder, preferably that provided with a gas bent, while heating it at a temperature at which the organic peroxide will be decomposed but not the foaming agent and while removing the unnecessary volatile substances via the bent which is disposed at a portion downstream the high temperature heating zone and extruding the molten blend through a T-die or a circular die arranged on the extruder to thereby obtain a foamable sheet which contains the foaming agent in substantially undecomposed state and which has been subjected to cross linking. This foamable sheet is then brought into foaming by a known foaming technique, for example, by a press foaming in which the foaming agent is decomposed under a pressurized condition, by a heat foaming in a molten salt bath in which the foaming agent is decomposed by heating under normal pressure, by a heat foaming in a hot blast oven, by a heat foaming by thermal radiant ray, by a heat foaming by microwave or by a combination of these techniques, to obtain a foamed article.

In an alternative method for producing a foamed article, a substantially foamed sheet can be obtained by blending the polypropylene resin composition according to the present invention, a foaming agent which is present in liquid or solid state at normal temperature and which develops a gas by heating and, if necessary, a heat stabilizer and so on, on a mixing apparatus, such as Henschel mixer, V-blender, ribbon blender or a tumbler blender, kneading the resulting blend using an extruder, while heating it at a temperature at which the foaming agent will be decomposed, and extruding the molten blend through a T-die or a circular die arranged on the extruder.

In a further alternative method for producing a foamed article, a substantially foamed sheet can be produced, by blending the polypropylene block-copolymer resin according to the present invention, a foaming nucleating agent and, if necessary, a heat stabilizer and so on, on a mixing apparatus, such as Henschel mixer, V-blender, ribbon blender or a tumbler blender, kneading the resulting blend using an extruder, while supplying continuously thereto a gas which is present at normal temperature and normal pressure in gas phase or a low boiling volatile foaming agent (low boiling organic solvent) via a nucleating agent feed nozzle disposed midway in the extruder cylinder and extruding the kneaded mass through a T-die or an annular die arranged on the extruder into a substantially foamed sheet.

By the method for producing the foamed article using a gas which exists in gas phase at normal temperature and normal pressure or a low boiling volatile foaming agent as described above, a foamed sheet having a fine foam cell structure of high foaming magnification ratio of, for example, at least 2-fold, with an average foam cell diameter of about 100 $\mu$m can be obtained, since the polypropylene block-copolymer resin according to the present invention is used as the starting resin. When a conventional polypropylene or a polypropylene block-copolymer resin other than the polypropylene block-copolymer resin according to the present invention is used as the starting resin, it is difficult to obtain a foamed sheet of a high foaming magnification ratio. Thus, for example, it is difficult to obtain a foamed sheet having a foaming magnification ratio of at least 2-fold and a fine foamcell structure with an average foam cell diameter of about 100 $\mu$m.

In a further alternative method for producing a foamed article, the polypropylene block-copolymer resin according to the present invention and, on requirement, heat stabilizer and so on are kneaded on a mixing apparatus, such as Henschel mixer, V-blender, ribbon blender or a tumbler blender, and the resulting blend is kneaded using an extruder to obtain a pelletized product. This pelletized product and a low boiling volatile foaming agent (low boiling organic solvent) are treated in a high-pressure vessel at a high temperature to obtain impregnated beads. The resulting impregnated beads are heated by hot steam to cause a preliminary foaming in order to adjust the diameter of the prefoamed cell, whereupon the so-treated beads are transferred to a ripening process step for restoring the internal pressure of the beads to normal pressure and are contacted with air sufficiently. The resulting ripened beads are then heated in a mold by, for example, hot steam, to cause final foaming to obtain foamed article.

Concrete examples of the foamed article include office supplies, such as file cases; automobile interiar furnishings, such as roof liner and so on; and others, such as trays, trays for food products, cups for noodles, lunch boxes, containers for fast foods, containers for retorts, vessels for frozen foods, vessels for cooked foods, heat resistant vessels for electronic oven, cups, synthetic timber, original rolled product of various foamed sheets, shock absorbers, heat insulators, sound insulators and vibration damping material.

For molding formed articles, such as blow-molded articles, vacuum- or pressure formings, calendered articles, extrusion-molded articles, stretched films, inflation films and various foamed articles using the polypropylene block-copolymer resin according to the present invention, the starting polypropylene block-copolymer resin may favorably contain at least one stabilizer among phenolic stabilizer, organophosphite stabilizer, thioether stabilizer, hindered amine stabilizer and higher fatty acid metal salts. Such additives may favorably be used each in an amount of 0.005–5 parts by weight, preferably 0.01–0.5 part by weight, per 100 parts by weight of the polypropylene block-copolymer resin according to the present invention.

As described above, the polypropylene block-copolymer resin according to the present invention has, due to the contents of specific components in a specific proportion and due to its material properties specified, a high melt tension with superior moldability and can afford to process into formed articles which have better appearance and are superior in the balance between the stiffness and the impact resistance and which are scarcely subject to deformation, even for large-sized articles, efficiently at high speed. In addition, the polypropylene block-copolymer resin according to the present invention exhibiting such superior characteristic properties can be produced easily without suffering from causing deterioration of the resin and from occurence of inferior dispersion of the resin.

By the process for producing the polypropylene block-copolymer resin according to the present invention, the polypropylene block-copolymer resin described above can be produced easily in a simple and efficient manner at a low cost, based on the fact that the specified polymers are produced each up to a specific yield in a multistage polymerization of at least three stages. By the fact that, in particular, in the first polymerization stage, polymerization of a specific higher molecular weight polypropylene part (A) is effected up to a definite yield and, in the second or subsequent polymerization stage, polymerization of a specific lower molecular weight polypropylene part (B) is carried out up to a definite yield and finally, in the third or subsequent polymerization stage, polymerization of a specific ethylene/$\alpha$-olefin copolymer part (C) is realized up to a definite yield, the polypropylene block-copolymer resin described above can be produced easily in a most simple manner efficiently at the lowest cost.

THE BEST MODE FOR EMBODYING THE INVENTION

Below, the present invention will be described by way of Examples.

Production Example 1

<<Solid Titanium Catalyst Component -1>>

A vibration mill was employed which is equipped with four crusher pots each having an inner volume of 4 liters and containing therein 9 kg of steel balls of 12 mm diameter. Each pot was charged with 300 g of anhydrous magnesium chloride, 115 ml of diisobutyl phthalate and 60 ml of titanium tetrachloride under a nitrogen atmosphere and the contents were crushed for 40 hours. 5 grams of the resulting co-crushed mass were treated by agitation for 30 minutes. Then, the mixture was stood still and the supernatant was removed. Then, the solids were washed with each 100 ml of n-heptane at 20° C. Washing was repeated three times. Then, the washed solids were dispersed in 100 ml of n-heptane to obtain a slurry of solid titanium catalyst component-1. The resulting solid titanium catalyst component-1 contained 2.0% by weight of titanium and 18% by weight of diisobutyl phthalate.

EXAMPLE 1

A polymerization reactor having an internal volume of 280 liters was charged under a nitrogen atmosphere with 100 liters of heptane, 13.6 grams of diluted triethylaluminum, 27.1 grams of dicyclopentyl-dimethoxysilane (in the following, sometimes abbreviated as DCPMS) and 7.1 grams of the solid titanium catalyst component-1 obtained in Production Example 1. After the nitrogen gas in the polymerization reactor was exhausted using a vacuum pump, the vessel was charged with propylene, whereupon the temperature of the vessel was started to elevate. At 60° C., propylene was supplied thereto continuously so as to maintain the internal pressure of the polymerization reactor at 0.15 MPa (gauge) and the polymerization was continued for 1.0 hour under a condition of substantial absence of hydrogen to obtain the higher molecular weight polypropylene part (the first stage polymerization was over). By sampling and analyzing a part of the slurry in the polymerization reactor after the completion of the first stage polymerization, an intrinsic viscosity [η] of 9.6 dl/g was observed for the higher molecular weight polypropylene part.

Then, the temperature was elevated to 70° C. and propylene and hydrogen were supplied continuously so as to maintain the internal pressure at 0.25 MPa (gauge) and the hydrogen concentration in the gas phase at 20 vol. %, whereupon the polymerization was continued for 2.5 hours to obtain the lower molecular weight polypropylene part (the second stage polymerization was over).

Then, the temperature was adjusted at 50° C. and propylene, ethylene and hydrogen were supplied continuously so as to maintain the internal pressure at 0.13 MPa (gauge) and the hydrogen concentration in the gas phase at 4 vol. %, whereupon the polymerization was continued for 1.3 hours to obtain the ethylene/propylene random copolymer part. Here, the supplied weight ratio of ethylene/propylene was 0.97 (the third stage polymerization was over).

After completion of the polymerization, the resulting slurry was transferred to an autoclave of a capacity of 500 liters charged with 10 liters of methanol to terminate the polymerization. Thereto were added further 115 liters of methanol and the mixture was agitated, whereupon purification and drying were performed in a usual manner to obtain 50 kg of a polypropylene block-copolymer resin.

The melt flow rate of the integral polypropylene block-copolymer resin obtained finally in this manner was found to be 1.8 g/10 min. The content of the higher molecular weight polypropylene part obtained in the first stage with respect to the finally obtained integral polypropylene block-copolymer resin was 25% by weight as calculated from the material balance. A paraxylene dissolution fractionation of the finally obtained integral polypropylene block-copolymer resin was carried out to analyze the component (X) soluble in 23° C. paraxylene and the component (Y) soluble in 135° C. paraxylene but insoluble in 23° C. paraxylene. The results of the analyses are given in Table 1. Further, the flexural modulus, Izod impact strength and heat distortion temperature after injection molding of the resin were determined. The results therefor are given in Table 1.

EXAMPLE 2

The procedures of Example 1 were pursued except that the internal pressure and the polymerization time in the polymerization reactor of the first stage were changed to 0.5 MPa (gauge) and 1.5 hours, respectively, that the internal pressure, the hydrogen concentration in the gas phase and the polymerization time in the polymerization reactor of the second stage were changed to 0.2 MPa (gauge), 12 vol. % and 2.5 hours, respectively, and that the internal pressure, the hydrogen concentration, the polymerization time and the supplied weight ratio of ethylene/propylene in the polymerization reactor of the third stage were changed to 0.11 MPa (gauge), 3 vol. %, 1.0 hour and 1.02, respectively, to obtain a polypropylene block-copolymer resin. The results are given in Table 1.

EXAMPLE 3

The procedures of Example 1 were pursued except that the internal pressure and the polymerization time in the polymerization reactor of the first stage were changed to 0.56 MPa (gauge) and 1.5 hours, respectively, that the internal pressure, the hydrogen concentration in the gas phase and the polymerization time in the polymerization reactor of the second stage were changed to 0.18 MPa (gauge), 4.8 vol. % and 2.3 hours, respectively, and that the internal pressure, the hydrogen concentration, the polymerization time and the supplied weight ratio of ethylene/propylene in the polymerization reactor of the third stage were changed to 0.07 MPa (gauge), 3.8 vol. %, 1.0 hour and 0.93, respectively, to obtain a polypropylene block-copolymer resin. The results are given in Table 1.

EXAMPLE 4

The procedures of Example 1 were pursued except that the internal pressure and the polymerization time in the polymerization reactor of the first stage were changed to 0.48 MPa (gauge) and 0.8 hour, respectively, that the internal pressure, the hydrogen concentration in the gas phase and the polymerization time in the polymerization reactor of the second stage were changed to 0.19 MPa (gauge), 3.9 vol. % and 2.5 hours, respectively, and that the internal pressure, the hydrogen concentration, the polymerization time and the supplied weight ratio of ethylene/propylene in the polymerization reactor of the third stage were changed to 0.08 MPa (gauge), 0.37 vol. %, 0.8 hour and 0.97, respectively, to obtain a polypropylene block-copolymer resin. The results are given in Table 1.

EXAMPLE 5

A polymerization reactor having an internal volume of 280 liters was charged under a nitrogen atmosphere with 100 liters of heptane, 13.6 grams of diluted triethylaluminum, 27.1 grams of dicyclopentyl-dimethoxysilane and 7.1 grams of the solid titanium catalyst component-l obtained in Production Example 1. After the nitrogen gas in the polymerization reactor was exhausted using a vacuum pump, the vessel was charged with propylene, whereupon the temperature of the vessel was started to elevate. At 60° C., propylene was supplied thereto continuously so as to maintain the internal pressure of the polymerization reactor at 0.49 MPa (gauge) and the polymerization was continued for 3.0 hours under a condition of substantial absence of hydrogen to obtain the higher molecular weight polypropylene part (the first stage polymerization was over). By sampling and analyzing a part of the slurry in the polymerization reactor after the completion of the first stage polymerization, an intrinsic viscosity [η] of 8.2 dl/g was observed for the higher molecular weight polypropylene part.

Then, the temperature was elevated to 70° C. and propylene and hydrogen were supplied continuously so as to maintain the internal pressure at 0.2 MPa (gauge) and the hydrogen concentration in the gas phase at 25 vol. %, whereupon the polymerization was continued for 4.0 hours to obtain the lower molecular weight polypropylene part (the second stage polymerization was over).

Then, the temperature was adjusted at 50° C. and propylene, ethylene and hydrogen were supplied continuously so as to maintain the internal pressure at 0.1 MPa (gauge) and the hydrogen concentration in the gas phase at 0.1 vol. %, whereupon the polymerization was continued for 0.5 hour to obtain the ethylene/propylene random copolymer part. Here, the supplied weight ratio of ethylene/propylene was 1.0 (the third stage polymerization was over).

After completion of the polymerization, the resulting slurry was transferred to an autoclave of a capacity of 500 liters charged with 10 liters of methanol to terminate the polymerization. Thereto were added further 115 liters of methanol and the mixture was agitated and the polymerization was terminated, whereupon purification and drying were performed in a usual manner to obtain 50 kg of a polypropylene block-copolymer resin.

The melt flow rate of the integral polypropylene block-copolymer resin obtained finally in this manner was found to be 0.5 g/10 min. The content of the higher molecular weight polypropylene part obtained in the first stage with respect to the finally obtained integral polypropylene block-copolymer resin was 42% by weight as calculated from the material balance. A dissolution fractionation with paraxylene of the finally obtained integral polypropylene block-copolymer resin was carried out to analyze the component (X) soluble in 23° C. paraxylene and the component (Y) soluble in 135° C. paraxylene but insoluble in 23° C. paraxylene. The results of the analyses are given in Table 1. Further, the flexural modulus, Izod impact strength and heat distortion temperature after injection molding of the resin were determined. The results therefor are given in Table 1.

EXAMPLE 6

The procedures of Example 5 were pursued except that the internal pressure and the polymerization time in the polymerization reactor of the first stage were changed to 0.49 MPa (gauge) and 1.5 hours, respectively, that the internal pressure, the hydrogen concentration in the gas phase and the polymerization time in the polymerization reactor of the second stage were changed to 0.18 MPa (gauge), 0.7 vol. % and 5.0 hours, respectively, and that the internal pressure, the hydrogen concentration, the polymerization time and the supplied weight ratio of ethylene/propylene in the polymerization reactor of the third stage were changed to 0.1 MPa (gauge), 3.0 vol. %, 2.8 hours and 1.1, respectively, to obtain a polypropylene block-copolymer resin. The results are given in Table 1.

Comparative Example 1

A polypropylene block-copolymer having a melt flow rate nearly equal to that of the polypropylene block-copolymer resin of Example 1 or of Example 2 (a product of Grand Polymer Co., Ltd. with the brand BJS-G) was subjected to a dissolution fractionation with paraxylene to analyze each component. The results of analyses are given in Table 2. Further, the flexural modulus, Izod impact strength and heat distortion temperature after injection molding of the resin were determined. The results therefor are given in Table 2.

Comparative Example 2

A polypropylene block-copolymer having a melt flow rate nearly equal to that of the polypropylene block-copolymer resins of Examples 3 to 6 (a product of Grand Polymer Co., Ltd. with the brand BEB-G) was subjected to a dissolution fractionation with paraxylene to analyze each component. The results of analyses are given in Table 2. Further, the flexural modulus, Izod impact strength and heat distortion temperature after injection molding of the resin were determined. The results therefor are given in Table 2.

Comparative Example 3

A polymerization reactor having an internal volume of 280 liters was charged under a nitrogen atmosphere with 100 liters of heptane, 13.6 grams of diluted triethylaluminum, 27.1 grams of dicyclopentyl-dimethoxysilane and 7.1 grams of the solid titanium catalyst component-1 obtained in Production Example 1. After the nitrogen gas in the polymerization reactor was exhausted using a vacuum pump, the vessel was charged with propylene, whereupon the temperature of the vessel was started to ascend. At 70° C., propylene and hydrogen were supplied thereto continuously so as to maintain the internal pressure of the polymerization reactor at 0.19 MPa (gauge) and the hydrogen concentration in the gas phase at 1.5 vol. % and the polymerization was continued for 3.0 hours (the first stage polymerization was over).

Then, the temperature was adjusted at 50° C. and propylene, ethylene and hydrogen were supplied continuously so as to maintain the internal pressure at 0.1 MPa (gauge) and the hydrogen concentration in the gas phase at 0.1 vol. %, whereupon the polymerization was continued for 0.5 hour. Here, the supplied weight ratio of ethylene/propylene was 1.0 (the second stage polymerization was over).

After completion of the polymerization, the resulting slurry was transferred to an autoclave of a capacity of 500 liters charged with 10 liters of methanol to terminate the polymerization. Thereto were added further 115 liters of methanol and the mixture was agitated, whereupon purification and drying were performed in a usual manner to obtain 45.4 kg of a polypropylene block-copolymer resin.

The melt flow rate of the integral polypropylene block-copolymer resin obtained finally in this manner was found to be 0.5 g/10 min. A paraxylene dissolution fractionation of the finally obtained integral polypropylene block-copolymer resin was carried out to analyze the component (X) soluble in 23° C. paraxylene and the component (Y) soluble in 135° C. paraxylene but insoluble in 23° C. paraxylene. The results of the analyses are given in Table 2. Further, the flexural modulus, Izod impact strength and heat distortion temperature after injection molding of the resin were determined. The results therefor are given in Table 2.

Comparative Example 4

The procedures of Comparative Example 3 were pursued except that the internal pressure, the hydrogen concentration and the polymerization time in the polymerization reactor of the first stage were changed to 0.18 MPa (gauge), 1.4 vol. % and 2.5 hours, respectively, and that the internal pressure, the hydrogen concentration, the polymerization time in the polymerization reactor and the supplied weight ratio of ethylene/propylene of the second stage were changed to 0.1 MPa (gauge), 3.9 vol. %, 2.8 hours and 1.0, respectively, to obtain a polypropylene block-copolymer resin. The results are given in Table 2.

TABLE 1

|  |  |  | Example |  |  |  |  |  |
|---|---|---|---|---|---|---|---|---|
|  |  |  | 1 | 2 | 3 | 4 | 5 | 6 |
| Melt flow rate | *1 | g/10 min | 1.8 | 2.0 | 0.4 | 0.7 | 0.5 | 0.5 |
| [η] of h. molecul. wt. PP | *2 | dl/g | 9.6 | 8.2 | 9.8 | 8.5 | 8.2 | 8.9 |
| Cont. of h. molecul. wt. PP | *3 | wt. % | 25 | 17 | 25 | 17 | 42 | 11 |
| [η] of l. molecul. wt. PP | *4 | dl/g | 1.1 | 1.4 | 2.1 | 2.2 | 0.4 | 2.9 |
| Cont. of l. molecul. wt. PP | *5 | wt. % | 61 | 68 | 60 | 69 | 52 | 55 |
| [η] of eth./prop. copolymer | *6 | dl/g | 1.7 | 3.3 | 3.0 | 3.0 | 8.1 | 3.3 |

TABLE 1-continued

|  |  |  | Example | | | | | |
| --- | --- | --- | --- | --- | --- | --- | --- | --- |
|  |  |  | 1 | 2 | 3 | 4 | 5 | 6 |
| Cont. of eth./prop. copolymer | *7 | wt. % | 14 | 15 | 15 | 14 | 6 | 34 |
| Content of ethylene | *8 | wt. % | 30 | 31 | 31 | 27 | 29 | 32 |
| Cont. of 23° C. p-xylene-sol. comp. | *9 | wt. % | 10.1 | 11.5 | 10.4 | 11.4 | 4.3 | 28.1 |
| Cont. of 135° C. p-xylene-sol. comp. | *10 | wt. % | 89.9 | 88.5 | 89.6 | 88.6 | 95.7 | 71.9 |
| Mw/Mn | *11 | — | 12.8 | 9.3 | 9.5 | 8.3 | 19.0 | 8.5 |
| Mz/Mw | *12 | — | 5.2 | 4.0 | 3.7 | 3.7 | 4.8 | 3.7 |
| mmmm-fraction | *13 | % | 97.4 | 98.2 | 98.3 | 97.9 | 98.2 | 98.4 |
| $S_H/S_L$ | *14 | — | 1.22 | 1.19 | 1.30 | 1.25 | 1.15 | 1.24 |
| Proportion of area for HMw-region | *15 | % | 9.4 | 8.2 | 10.6 | 9.4 | 20.0 | 9.4 |
| Proporn. of 124° C.-eluted segment | *16 | wt. % | 15.8 | 7.7 | 17.9 | 13.7 | 20.2 | 13.1 |
| Mw of 124° C.-eluted segment | *17 | — | $1.6 \times 10^6$ | $1.5 \times 10^6$ | $1.6 \times 10^6$ | $1.5 \times 10^6$ | $1.6 \times 10^6$ | $1.6 \times 10^6$ |
| Melt tension | *18 | g | 7.6 | 6.3 | 12.7 | 8.5 | 18.3 | 11.5 |
| Flexural modulus | *19 | MPa | 1423 | 1406 | 1572 | 1378 | 1827 | 790 |
| Izod impact strength (23° C.) | *20 | J/m | 114 | 102 | 529 | 385 | 98 | 712 |
| Heat distort. temp. at 0.45 MPa | *21 | ° C. | 125 | 125 | 120 | 121 | 132 | 109 |

TABLE 2

|  |  |  | Comparative Example | | | |
| --- | --- | --- | --- | --- | --- | --- |
|  |  |  | 1 | 2 | 3 | 4 |
| Melt flow rate | *1 | g/10 min | 2.5 | 0.5 | 0.5 | 0.5 |
| [η] of h. molecul. wt. PP | *2 | dl/g | — | — | — | — |
| Cont. of h. molecul. wt. PP | *3 | wt. % | 0 | 0 | 0 | 0 |
| [η] of l. molecul. wt. PP | *4 | dl/g | 2.2 | 3.3 | 2.9 | 3.3 |
| Cont. of l. molecul. wt. PP | *5 | wt. % | 90 | 88 | 93 | 65 |
| [η] of eth./prop. copolymer | *6 | dl/g | 3.2 | 3.0 | 8.3 | 3.3 |
| Cont. of eth./prop. copolymer | *7 | wt. % | 10 | 12 | 7 | 35 |
| Content of ethylene | *8 | wt. % | 28 | 30 | 29 | 32 |
| Cont. of 23° C. p-xylene-sol. comp. | *9 | wt. % | 6.3 | 8.0 | 4.1 | 28.0 |
| Cont. of 135° C. p-xylene-sol. comp. | *10 | wt. % | 93.7 | 92.0 | 95.9 | 72.0 |
| Mw/Mn | *11 | — | 6.3 | 6.4 | 5.1 | 5.3 |
| Mz/Mw | *12 | — | 3.3 | 3.0 | 2.9 | 2.5 |
| mmmm-fraction | *13 | % | 96.5 | 96.6 | 98.3 | 98.2 |
| $S_H/S_L$ | *14 | — | 1.02 | 1.06 | 1.04 | 1.07 |
| Proportion of area for HMw-region | *15 | % | 5.2 | 10.6 | 8.2 | 7.8 |
| Proporn. of 124° C.-eluted segment | *16 | wt. % | 1.3 | 4.3 | 5.2 | 5.4 |
| Mw of 124° C.-eluted segment | *17 | — | $8.2 \times 10^5$ | $1.4 \times 10^6$ | $1.3 \times 10^6$ | $1.3 \times 10^6$ |
| Melt tension | *18 | g | 1.6 | 6.4 | 6.2 | 5.3 |
| Flexural modulus | *19 | MPa | 1278 | 1160 | 1378 | 630 |
| Izod impact strength (23° C.) | *20 | J/m | 91 | 449 | 73 | 803 |
| Heat distort. temp. at 0.45 MPa | *21 | ° C. | 117 | 114 | 118 | 102 |

Notes:
*1: Melt flow rate, determined under the condition according to ASTM D 1238.
*2: Intrinsic viscosity [η] of the higher molecular weight polypropylene part (A), determined in decalin at 135° C.
*3: Content of the higher molecular weight polypropylene part (A) in the entire resin.
*4: Intrinsic viscosity [η] of the lower molecular weight polypropylene part (B), determined in decalin at 135° C.
*5: Content of the lower molecular weight polypropylene part (A) in the entire resin.
*6: Intrinsic viscosity [η] of the ethylene/propylene copolymer part (C), determined in decalin at 135° C.
*7: Content of the ethylene/propylene copolymer part (C) in the entire resin.
*8: Content of ethylene in the ethylene/propylene copolymer part (C).
*9: Content of the component soluble in 23° C. paraxylene in the entire resin.
*10: Content of the component soluble in 135° C. paraxylene but insoluble in 23° C. paraxylene.
*11: Mw/Mn, determined by GPC under the following determination condition:
Apparatus: Model GPC 150 CV of the firm Waters
Column: PL COLUMN (Mixed-B, 350 mm × 2) of Polymer Laboratories Inc.
Data processer: MILLENIUM
Determination temperature: 135° C.
Solvent for the determination: orthodichlorobenzene
Calibration curve: prepared using monodisperse polystyrenes of known molecular weights in accordance with the viscosity equation $[\eta] = KM^\alpha$, in which the values for K and α are settled: $K = 1.03 \times 10^{-4}$ (dl/g) and α = 0.78 for polypropylene and $K = 1.38 \times 10^{-4}$ (dl/g) and α = 0.70 for polystyrene.
*12: Mz/Mw, determined by GPC: for details, see the above *11.
*13: Isotactic pentad fraction, determined by $^{13}$C-NMR.

TABLE 2-continued

|  | Comparative Example | | | |
|---|---|---|---|---|
|  | 1 | 2 | 3 | 4 |

*14: $S_H/S_L$: the ratio of the surface area $A_H$ for the higher molecular weight side half resulting from the molecular weight distribution diagram obtained by gel permeation chromatography (GPC), when subdividing the area confined between the molecular weight distribution curve and the axis of abscissa (molecular weight) by a line parallel to the ordinate into two halves, #
relative to the surface area $S_L$ for the lower molecular weight side thereof.
*15: Proportion of the higher molecular weight region: the proportion of the surface area for the higher molecular weight portion of molecular weights of at least $1.5 \times 10^6$ in the molecular weight distribution diagram obtained by GPC relative to integral surface area confined between the molecular weight distribution curve and the axis of abscissa (molecular weight).
*16: Proportion of eluted segment eluted by o-dichlorobenzene at 124° C. determined by cross-fractionating chromatography (CFC), wherein the CFC-determination is performed using an apparatus provided with a temperature rising elution fractionation column (TREF column) for composition fractionation and with a GPC column for molecular weight fractionation as described below under the condition #
given below to determine the proportion of the 124° C.-eluted segemt as well as the weight-average molecular weight (Mw) thereof:
Apparatus: CFC T-150A (trademark. supplied from Mitsubishi Petrochemical Co., Ltd.)
Column: Shodex AT-806MS (three sets)
Eluent: o-dichlorobenzene
Flow rate: 1.0 ml/min.
Sample concentration: 0.3 wt./vol. % (containing 0.1% BHT)
Injected amount: 0.5 ml
Solubility: soluble completely
Detector: IR-absorptiometer, 3.42 $\mu$(2924 cm$^{-1}$), NaCl plate
Elution temperature: 0 to 135° C. in 28 fractions:0, 10, 20, 30, 40, 50, 55, 60, 65, 70, 75, 80, 85, 90, 94, 97, 100, 103, 106, 109, 112, 115, 118, 121, 124, 127 and 135° C.
*17: Weight-average molecular weight of the 124° C.-eluted segment obtained by CFC; for details. see the above *16.
*18: Melt tension was determined under the conditions given below:
Apparatus: CAPILLOGRAPH 1C (trademark, supplied from Toyo Seiki Seisaku-Sho. Ltd.)
Temperature: 230° C.
Orifice: L = 8.00 mm, D = 2.095 mm
Extrusion velocity: 15 mm/min.
Drawing velocity: 10 m/min.
*19: Flexural modulus was determined under the condition according to ASTM D 790 for test specimen made by injection-molding a pelletized product obtained by extruding a resin blend containing an antioxidant on a single screw extruder (supplied from K. K. Ishinaka Tekkojo) under melt kneading at 240° C.
*20: Izod impact strength (23° C.) was determined under the conditions in accordance with ASTM D 256 for an injection-molded specimen obtained in the same manner as that of the above *19.
*21 Heat distortion temperature (under a load of 0.45 MPa) was determined under the conditions in accordance with ASTM D 648 for an injection-molded specimen obtained in the same manner as that of the above *19.

What is claimed is:

1. A polypropylene block-copolymer resin comprising
   (A) 10–50% by weight of a higher molecular weight polypropylene part having an intrinsic viscosity [η], determined in decalin at 135° C., of 6–13 dl/g,
   (B) 10–89% by weight of a lower molecular weight polypropylene part having an intrinsic viscosity [η], determined in decalin at 135° C. of lower than 6 dl/g and
   (C) 1–40% by weight of an ethylene/α-olefin copolymer part having an intrinsic viscosity [η], determined in decalin at 135° C., of 0.1–13 dl/g,
   wherein the block-copolymer resin has, when being subjected to a dissolution fractionation with paraxylene, contents of constituent components of
   (X) 2–39% by weight of a component soluble in paraxylene of 23° C. and
   (Y) 61–98% by weight of a component soluble in paraxylene of 135° C. but insoluble in paraxylene of 23° C. and exhibits the following characteristics features <<1>> and <<2>>, namely,
      <<1>> a melt flow rate (MFR), determined at 230° C. under a load of 2.16 kg, of 0.01–5 g/10 min. and
      <<2>> a molecular weight distribution expressed by Mw/Mn, determined by gel permeation chromatography (GPC), of 6–20 and an Mz/Mw value of at least 3.5.

2. A polypropylene block-copolymer resin as claimed in claim 1, wherein the ethylene/α-olefin copolymer part (C) is an ethylene/α-olefin random copolymer having an ethylene content of 20–40% by weight and a content of an α-olefin of 3–12 carbon atoms of 60–80% by weight.

3. A polypropylene block-copolymer resin as claimed in claim 2, wherein the ethylene/α-olefin copolymer part (C) is an ethylene/propylene random copolymer.

4. A polypropylene block-copolymer resin as claimed in any one of claims 1 to 3, wherein it has the following characteristic feature <<3>>, namely,
   <<3>> an isotactic pentad fraction (mmmm-fraction) of the component (Y) soluble in paraxylene of 135° C. but insoluble in paraxylene of 23° C., determined by $^{13}$C-NMR, of at least 96%.

5. A polypropylene block-copolymer resin as claimed in any one of claims 1 to 3, wherein it has the following characteristic feature <<4>>, namely,
   <<4>> a molecular weight distribution of the component (Y) soluble in paraxylene of 135° C. but insoluble in paraxylene of 23° C., held under such a condition that, when the molecular weight distribution curve of the component (Y) on the molecular weight distribution diagram obtained by gel permeation chromatography (GPC) is divided at the maximum peak molecular weight into the higher molecular weight side half and the lower molecular weight side half, the ratio of the surface area $S_H$ for the higher molecular weight side half underlying under the said distribution curve relative to the surface area $S_L$ for the lower molecular weight side half underlying under the said distribution curve, namely, $S_H/S_L$, is at least 1.1 and the proportion of the surface area for a higher molecular weight portion of molecular weights of at least $1.5 \times 10^6$ relative to the integral surface area underlying under the entire molecular weight distribution curve is at least 8%.

6. A polypropylene block-copolymer resin as claimed in any one of claims 1 to 3, wherein it has the following characteristic feature <<5>>, namely, <<5>> a proportion of the 124° C.-eluted segment of the component (Y) soluble in paraxylene of 135° C. but insoluble in paraxylene of 23° C., determined by cross-fractionating chromatography (CFC), of at least 6% by weight and a weight-average molecular weight (Mw) of the said 124° C.-eluted segment of at least $1.0 \times 10^6$.

7. A polypropylene block-copolymer resin as claimed in any one of claims 1 to 3, wherein it has the following characteristic feature <<6>>, namely, <<6>> a melt tension (MT), determined by flow tester at 230° C., of 5–30 g.

8. A process for producing a polypropylene block-copolymer resin as claimed in any one of claims 1 to 3, comprising polymerizing the monomers in a multistage polymerization of at least three stages in the presence of a polymerization catalyst formed from
 (a) a solid catalyst component based on titanium containing magnesium, titanium, a halogen and an electron donor,
 (b) a catalyst component based on organometallic compound and
 (c) a catalyst component based on organosilicic compound having at least one group selected from the group consisting of cyclopentyl, cyclopentenyl, cyclopentadienyl and derivatives of them, the said process comprising a stage of making up a higher molecular weight polypropylene part (A) having an intrinsic viscosity [η] of 6–13 dl/g up to a proportion of 10–50% by weight with respect to the total amount of the finally obtained polypropylene block-copolymer resin, by polymerizing propylene under substantial absence of hydrogen, a stage of making up a lower molecular weight polypropylene part (B) having an intrinsic viscosity [η] lower than 6 dl/g up to a proportion of 10–89% by weight with respect to the total amount of the finally obtained polypropylene block-copolymer resin, by polymerizing propylene, and a stage of making up an ethylene/α-olefin copolymer part (C) having an intrinsic viscosity [η] of 0.1–13 dl/g up to a proportion of 1–40% by weight with respect to the total amount of the finally obtained polypropylene block-copolymer resin, by copolymerizing ethylene with an α-olefin.

9. A process for producing a polypropylene block-copolymer resin as claimed in any one of claims 1 to 3, comprising polymerizing the monomers by a multistage polymerization of at least three stages in the presence of a polymerization catalyst formed from
 (a) a solid catalyst component based on titanium, containing magnesium, titanium, a halogen and an electron donor,
 (b) a catalyst component based on organometallic compound and
 (c) a catalyst component based on organosilicic a compound having at least one group selected from the group consisting of cyclopentyl, cyclopentenyl, cyclopentadienyl and derivatives of them, the said process comprising making up, in one or more polymerization steps in the first stage, a higher molecular weight polypropylene part (A) having an intrinsic viscosity [η] of 6–13 dl/g up to a proportion of 10–50% by weight with respect to the total amount of the finally obtained polypropylene block-copolymer resin, by polymerizing propylene under substantial absence of hydrogen, making up, then, in one or more polymerization steps in the second stage, a lower molecular weight polypropylene part (B) having an intrinsic viscosity [η] lower than 6 dl/g up to a proportion of 10–89% by weight with respect to the total amount of the finally obtained polypropylene block-copolymer resin, by polymerizing propylene and making up, then, in one or more polymerization steps in the third stage, an ethylene/α-olefin copolymer part (C) having an intrinsic viscosity [η] of 0.1–13 dl/g up to a proportion of 1–40% by weight with respect to the total amount of the finally obtained polypropylene block-copolymer resin, by copolymerizing ethylene with an α-olefin.

10. A process for producing a polypropylene block copolymer resin in a continuous multistage polymerization process, comprising (A) in a first stage, polymerizing propylene in the substantial absence of hydrogen, in the presence of a polymerization catalyst formed from
 (a) a solid titanium catalyst component comprising titanium, magnesium, halogen and electron donor,
 (b) an organometallic catalyst component and,
 (c) an organosilic compound catalyst component having at least one cyclic group selected from the group consisting of cyclopentyl group, cyclopentenyl group and cyclopentadienyl group or derivative of any of said cyclic groups;
to form a higher molecular weight polypropylene part (A), having an intrinsic viscosity (η) of from 6 to 13 dl/g, wherein the amount of said polypropylene part (A) is from 10 to 50 percent by weight, based on the total weight of said polypropylene block copolymer resin;

(B) in a second stage, polymerizing propylene in the presence of said polymerization catalyst to form a lower molecular weight polypropylene part (B), having an intrinsic viscosity (η) lower than 6 dl/g, wherein the amount of said polypropylene part (B) is from 10 to 80 percent by weight, based on the total weight of said polypropylene block copolymer resin; and, (C) in a third stage, copolymerizing ethylene and α-olefin to form an ethylene/α-olefin copolymer part (C), having an intrinsic viscosity (n) of from 0.1 to 13 dl/g, wherein the amount of said copolymer part (C) is from 1 to 40 percent by weight, based on the total weight of said polypropylene block copolymer resin;

said first stage, second stage and third stage polymerizations being effected continuously in any order, and wherein, when said polypropylene block copolymer resin is subjected to a dissolution fractionation with paraxylene, the constituent components comprise
(X) 2 to 39% by weight of a component soluble in paraxylene at 23° C. and
(Y) 61 to 98% by weight of a component soluble in paraxylene at 135° C., but insoluble in paraxylene at 23° C.;

and further wherein, said polypropylene block copolymer resin has the following properties:
(1) a melt flow rate (MFR), determined at 230° C., under a load of 2.16 kg, of 0.01 to 5 g/10 min. and
(2) a molecular weight distribution, Mw/Mn, determined by gel permeation chromatography (GPC), of 6 to 20 and Mz/Mw of at least 3.5.

11. The process according to claim 10, wherein, said third stage (C) comprises copolymerizing ethylene and α-olefin of from 3 to 20 carbon atoms in amounts to form an ethylene/α-olefin random copolymer having from 20 to 40% by weight of ethylene and from 60 to 80% by weight of said α-olefin.

12. The process according to claim 11, wherein said α-olefin comprises propylene thereby forming in said third stage an ethylene/propylene random copolymer.

13. The process for producing a polypropylene block copolymer resin in a continuous multistage polymerization as set forth in claim 10, wherein the first, second and third stages are carried out continuously and consecutively, in the stated order.

14. The process according to claim 13, wherein the copolymerization in the third stage is carried out using ethylene and α-olefin having from 3 to 20 carbon atoms, in amounts to produce an ethylene/α-olefin random copolymer containing from 20 to 40% by weight ethylene and from 60 to 80% by weight of said α-olefin.

15. The process according to claim 14, wherein the α-olefin comprises propylene.

16. The process according to claim 14, wherein at least one of the first, second or third stages are effected using at least two polymerization reactors.

17. The process according to claim 10, wherein at least one of the first, second or third stages are effected using at least two polymerization reactors.

18. The polypropylene block-copolymer resin according to claim 1, which comprises
(A) from 10 to 45% by weight of said higher molecular weight polypropylene part, wherein the intrinsic viscosity (η), determined in decalin, at 135° C., is from 8 to 13 dl/g;
(B) from 35 to 80% by weight of said lower molecular weight polypropylene part, wherein the intrinsic viscosity (η), determined in decalin, at 135° C., is from 0.1 to 6 dl/g;
(C) from 5 to 40% by weight of said ethylenel/α-olefin copolymer, wherein the intrinsic viscosity, determined in decalin, at 135° C., is from 1 to 11 dl/g; and,
wherein the block-copolymer resin has, when subjected to dissolution fractionation with paraxylene, has said constituent components (X) and (Y), as follows:
(X) 4 to 35% by weight of component soluble in paraxylene at 23° C.; and
(Y) 65 to 96% by weight of component soluble in paraxylene at 135° C., but insoluble in paraxylene at 23° C.; and, further,
wherein the resin has the following values for <<1>> melt flow rate, (MFR), and <<2>> molecular weight distribution, Mw/Mn, and Mz/Mw:
<<1>>MFR, determined at 230° C. under a load of 2.16 kg, of 0.1 to 5 g/10 min, and
<<2>>Mw/Mn of from 8 to 20 and Mz/Mw of from 3.5 to 6.

19. The polypropylene block-copolymer resin according to claim 1, which comprises
(A) from 10 to 43% by weight of said higher molecular weight polypropylene part, wherein the intrinsic viscosity (η), determined in decalin, at 135° C., is from 8.5 to 12 dl/g;
(B) from 45 to 80% by weight of said lower molecular weight polypropylene part, wherein the intrinsic viscosity (η), determined in decalin, at 135° C., is from 0.1 to 5 dl/g;
(C) from 5 to 35% by weight of said ethylenel/α-olefin copolymer, wherein the intrinsic viscosity, determined in decalin, at 135° C., is from 1 to 9 dl/g; and,
wherein the block-copolymer resin has, when subjected to dissolution fractionation with paraxylene, has said constituent components (X) and (Y), as follows:
(X) 4 to 30% by weight of component soluble in paraxylene at 23° C.; and
(Y) 70 to 96% by weight of component soluble in paraxylene at 135° C., but insoluble in paraxylene at 23° C.; and, further,
wherein the resin has the following values for <<1>> melt flow rate, (MFR), and <<2>> molecular weight distribution, Mw/Mn, and Mz/Mw:
<<1>>MFR, determined at 230° C. under a load of 2.16 kg, of 0.1 to 5 g/10 min, and
<<2>>Mw/Mn of from 8 to 20 and Mz/Mw of from 3.5 to 6.

20. The polypropylene block-copolymer resin according to claim 18 or claim 19, wherein the ethylene/α-olefin copolymer part (C) is an ethylene/α-olefin random copolymer having an ethylene content of 22 to 38% by weight, and wherein said α-olefin has from 3 to 8 carbon atoms, and is present in an amount of from 62 to 78% by weight.

21. The polypropylene block-copolymer resin according to claim 20, wherein the ethylene/α-olefin random copolymer is an ethylene/propylene random copolymer.

22. A blow-molded article which is produced by blow-molding a blow-moldable resin composition comprising the polypropylene block-copolymer resin of claim 1.

23. A vacuum-formed or pressure-formed article which is produced by vacuum or pressure forming a moldable composition comprising the polypropylene block-copolymer resin composition of claim 1.

24. A foamed article produced by foaming a foamable composition comprising the polypropylene block-copolymer resin composition of claim 1.

25. An extrusion-molded article which is produced by extrusion-molding an extrusion-moldable composition comprising the polypropylene block-copolymer resin composition of claim 1.

26. A stretched film which is produced by stretching a film comprising the polypropylene block-copolymer resin composition of claim 1.

* * * * *